United States Patent
Takahashi et al.

(10) Patent No.: US 8,203,122 B1
(45) Date of Patent: Jun. 19, 2012

(54) THERMOELECTRIC CONVERSION DEVICE, AND RADIATION DETECTOR AND RADIATION DETECTION METHOD USING THE SAME

(75) Inventors: Kohei Takahashi, Osaka (JP); Tsutomu Kanno, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/358,293

(22) Filed: Jan. 25, 2012

Related U.S. Application Data

(63) Continuation of application No. 13/190,129, filed on Jul. 25, 2011, now Pat. No. 8,129,689, which is a continuation of application No. PCT/JP2010/003566, filed on May 27, 2010.

(51) Int. Cl.
*G01T 1/24* (2006.01)
(52) U.S. Cl. .................................. 250/371; 250/370.01
(58) Field of Classification Search ............... 250/336.1, 250/338.1, 338.4, 370.01, 371
See application file for complete search history.

(56) References Cited

U.S. PATENT DOCUMENTS

| | | | |
|---|---|---|---|
| 4,072,864 | A | 2/1978 | Von Gutfeld |
| 5,793,092 | A | 8/1998 | Habermeier et al. |
| 5,823,682 | A | 10/1998 | Betz |
| 7,601,909 | B2 | 10/2009 | Kanno et al. |
| 2010/0327165 | A1 | 12/2010 | Takahashi et al. |

FOREIGN PATENT DOCUMENTS

| | | |
|---|---|---|
| JP | 53-076778 A | 7/1978 |
| JP | 7-318420 A | 12/1995 |
| JP | 8-247851 A | 9/1996 |
| JP | 10-070315 A | 3/1998 |
| JP | 10-079532 A | 3/1998 |
| WO | WO 2008/056466 A1 | 5/2008 |
| WO | WO 2010/058559 A1 | 5/2010 |

OTHER PUBLICATIONS

United States Notice of Allowance issued in U.S. Appl. No. 13/190,129, mailed Dec. 20, 2011.
T. Kanno et al., "Enhancement of transverse thermoelectric power factor in tilted Bi/Cu multilayer," Applied Physics Letters, vol. 94, No. 6, p. 061917 (2009).
A. Kyarad et al., "Transverse Peltier effect in tilted Pb-Bi2Te3 multilayer structures," Applied Physics Letters, vol. 89, No. 19, p. 192103 (2006).
A. Kyarad et al., "Al—Si multilayers: A synthetic material with large thermoelectric anisotropy," Applied Physics Letters, vol. 85, No. 23, pp. 5613-5615 (2004).
K. Takahashi et al., "Tailoring of inclined crystal orientation in layered cobaltite thin films for the development of off-diagonal thermoelectric effect," Applied Physics Letters, vol. 95, No. 5, p. 051913 (2009).

*Primary Examiner* — Mark R Gaworecki
(74) *Attorney, Agent, or Firm* — McDermott Will & Emery LLP

(57) ABSTRACT

A radiation detector including a substrate; a first inclined thin film disposed on a first main surface of the substrate, and having crystal planes serving as a factor in inducing anisotropy; a second inclined thin film disposed on a second main surface of the substrate opposite to the first main surface, and having crystal planes serving as a factor in inducing anisotropy; a first electrode pair of electrodes disposed on the first inclined thin film, the electrodes being opposed to each other in a direction in which the crystal planes of the first inclined thin film are aligned inclined to the first main surface; and a second electrode pair of electrodes disposed on the second inclined thin film, the electrodes being opposed to each other in a direction in which the crystal planes of the second inclined thin film are aligned inclined to the second main surface.

6 Claims, 11 Drawing Sheets

US 8,203,122 B1

THERMOELECTRIC CONVERSION DEVICE, AND RADIATION DETECTOR AND RADIATION DETECTION METHOD USING THE SAME

RELATED APPLICATIONS

This application is a Continuation of U.S. application Ser. No. 13/190,129, filed on Jul. 25, 2011 now U.S. Pat. No. 8,129,689, which is a continuation of PCT International Application No. PCT/JP2010/003566, filed on May 27, 2010, the disclosures of which Applications are incorporated by reference herein.

BACKGROUND OF THE INVENTION

1. Field of the Invention

The present invention relates to a thermoelectric conversion device, a radiation detector, and a radiation detection method that utilize an anisotropic thermoelectric effect.

2. Description of Related Art

When a temperature difference occurs between both ends of a thermoelectric conversion material, an electromotive force (a thermal electromotive force) is generated in proportion to the temperature difference. The phenomenon that thermal energy is converted into electrical energy in a thermoelectric conversion material is known as the Seebeck effect. The generated electromotive force V is expressed as V=SΔT, where ΔT is a temperature difference and S is a Seebeck coefficient peculiar to the material.

Generally, in a thermoelectric conversion material that exhibits isotropic physical properties, an electromotive force is generated by the Seebeck effect only in the same direction as the direction in which the temperature difference has occurred. In contrast, in a thermoelectric conversion material that exhibits anisotropy in its electrical transport properties, an electromotive force is generated in the direction orthogonal to the direction in which the temperature difference has occurred, due to the inclined arrangement of the crystal axes of the material. The electrical transport properties are the behavior of electrically-charged electrons and positive holes that move in a substance. As described above, the phenomenon that due to the inclined arrangement of the crystal axes of the material, an electromotive force is generated in the direction different from the direction in which the temperature difference has occurred (a heat flow direction) is referred to as an anisotropic thermoelectric effect or an off-diagonal thermoelectric effect.

FIG. 10 is a diagram of a coordinate system for explaining the anisotropic thermoelectric effect. As shown in FIG. 10, the crystal axes abc of a sample 100 are inclined to the spatial axes xyz. In the sample 100, when a temperature difference ΔTz is applied in the direction along the z axis, an electromotive force Vx is generated in the direction orthogonal to the z axis, i.e. the direction along the x axis. The electromotive force Vx is represented by Formula (1):

[Mathematical Formula 1]

$$V_x = \frac{1}{2d} \Delta T_z \cdot \Delta S \cdot \sin 2\alpha \quad (1)$$

where l denotes the width of the sample 100, d denotes the thickness of the sample 100, α denotes the inclination angle of the a-b plane to the surface (the x-y plane) of the sample 100, and ΔS denotes the difference (the difference that occurs due to anisotropy) between the Seebeck coefficient Sc in the c-axis direction and the Seebeck coefficient Sab in the a-b in-plane direction.

As shown above, the anisotropic thermoelectric effect is obtained in a thermoelectric conversion material in which the crystal planes serving as a factor inducing anisotropy thereof (hereinafter referred to simply as "crystal planes" corresponding to the a-b planes in the sample 100 shown in FIG. 10) are arranged inclined to the surface of the thermoelectric conversion material (corresponding to the surface (x-y plane) of the sample 100 shown in FIG. 10).

Conventionally, there has been proposed, as a thermoelectric conversion device that utilizes this effect, a thermoelectric conversion device in which a thin film (hereinafter referred to as an "inclined thin film") made of a thermoelectric conversion material is disposed on a substrate and the crystal planes of the material are arranged inclined to the substrate plane (the main surface of the substrate). It has also been proposed to use a thermoelectric conversion device having this configuration as a radiation detector (see, for example, JP 08 (1996)-247851 A).

FIG. 11 shows the basic structure of a thermoelectric conversion device that utilizes the anisotropic thermoelectric effect. This thermoelectric conversion device comprises an inclined substrate 111, an inclined thin film 112 disposed on the inclined substrate 111, and a pair of electrodes 113, 114 disposed on the inclined thin film 112. The inclined substrate means a substrate in which the low-index planes (planes 116 in the inclined substrate 111 shown in FIG. 11) of a crystal as a material that constitutes the substrate are inclined to the substrate plane. The inclined thin film is the one as described above, and in the basic structure shown in FIG. 11, the crystal planes 115 of the inclined thin film 112 are inclined to the surface of the inclined substrate 111. In FIG. 11, the referential sign 119 indicates a direction in which the crystal planes 115 are aligned in an inclined manner, and the referential sign 120 indicates a direction in which the planes 116 of the inclined substrate 111 are aligned in an inclined manner.

In a radiation detector that utilizes a thermoelectric conversion device having such a configuration, when an incident electromagnetic wave enters the radiation detector through the front surface of the inclined thin film 112, a temperature gradient 117 occurs in the direction from the front surface of the inclined thin film 112 to the back surface thereof of the radiation detector. As a result, an electromotive force is generated in the direction 118 parallel to the surface of the inclined thin film 112 by the above-mentioned anisotropic thermoelectric effect. Reading the electromotive force thus generated allows the electromagnetic wave to be detected.

However, conventional techniques have not achieved a sufficiently high sensitivity for practical use of radiation detectors.

One of the problems to be solved to increase the sensitivity of this type of radiation detectors is that the energy of the incident electromagnetic wave is not utilized (i.e., the energy is not converted into a thermal electromotive force) effectively. The proportion of the incident electromagnetic wave energy converted into a thermal electromotive force depends on the proportion of the electromagnetic wave absorbed in the inclined thin film. The thickness of the inclined thin film can be increased to increase the absorption of the electromagnetic wave in the inclined thin film. However, according to the above Formula (1), when the temperature difference is constant, the electromotive force that is generated by the anisotropic thermoelectric effect decreases as the thickness of the inclined thin film increases. Therefore, it is desirable to reduce the thickness of the inclined thin film in order to increase the sensitivity of the radiation detector. However, if the thickness is reduced, the proportion of the electromagnetic wave absorbed in the inclined thin film decreases, and thus the electromagnetic wave energy is not converted effectively into a thermal electromotive force. This means that techniques for converting the incident electromagnetic wave more effectively into a thermal electromotive force are necessary to increase the sensitivity of the radiation detector.

SUMMARY OF THE INVENTION

The present invention is intended to improve the detection sensitivity of radiation detectors in this technical field. As described above, a radiation detector that utilizes a thermoelectric conversion device having a conventional structure cannot exhibit a sufficiently high detection sensitivity for practical use thereof in a wider range of applications. In order to increase the sensitivity of the radiation detector, the incident electromagnetic wave that has entered the device needs to be converted effectively into a thermal electromotive force so as to generate a greater thermal electromotive force. Therefore, it is an object of the present invention to provide a thermoelectric conversion device capable of effectively converting an incident electromagnetic wave into a thermal electromotive force so as to generate a greater thermal electromotive force, and further provide a radiation detector using the thermoelectric conversion device. It is another object of the present invention to provide a radiation detection method using a radiation detector.

In order to provide a radiation detector with sufficiently high performance for practical use, the present inventors have made extensive studies of the configuration of a thermoelectric conversion device including an inclined thin film. As a result, we have found out that in a basic structure, i.e., an inclined thin film/substrate heterostructure (see FIG. 11), the polarity of an electromotive force that is generated when a continuous electromagnetic wave enters the structure from the inclined thin film side is the same as that of an electromotive force that is generated when a continuous electromagnetic wave enters the structure from the substrate side. This means that when a continuous electromagnetic wave enters a thermoelectric conversion device having the above-mentioned basic structure, the inclined thin film has a lower temperature at the interface between the inclined thin film and the substrate than at the interface between air and the inclined thin film, regardless of the direction in which the electromagnetic wave enters. Based on this unexpected finding, the present inventors have completed the configuration of the thermoelectric conversion device and that of the radiation detector of the present invention. As stated herein, an "inclined thin film/substrate" structure means a layered heterostructure of an inclined thin film and a substrate that are stacked in this order from the top. Hereinafter, the same expression has the same meaning.

The first thermoelectric conversion device of the present invention includes: a substrate; a first inclined thin film disposed on a first main surface of the substrate, the first inclined thin film having crystal planes serving as a factor in inducing anisotropy, and the crystal planes being aligned inclined to the first main surface; and a second inclined thin film disposed on a second main surface of the substrate opposite to the first main surface, the second inclined thin film having crystal planes serving as a factor in inducing anisotropy, and the crystal planes being aligned inclined to the second main surface.

The second thermoelectric conversion device of the present invention includes: a substrate; an inclined thin film disposed on a first main surface of the substrate, the inclined thin film having crystal planes serving as a factor in inducing anisotropy, and the crystal planes being aligned inclined to the first main surface; and an electromagnetic wave reflection film disposed on a second main surface of the substrate opposite to the first main surface.

The first radiation detector of the present invention includes: a substrate; a first inclined thin film disposed on a first main surface of the substrate, the first inclined thin film having crystal planes serving as a factor in inducing anisotropy, and the crystal planes being aligned inclined to the first main surface; a second inclined thin film disposed on a second main surface of the substrate opposite to the first main surface, the second inclined thin film having crystal planes serving as a factor in inducing anisotropy, and the crystal planes being aligned inclined to the second main surface; a first electrode pair of electrodes disposed on the first inclined thin film, the electrodes being opposed to each other in a direction in which the crystal planes of the first inclined thin film are aligned inclined to the first main surface; and a second electrode pair of electrodes disposed on the second inclined thin film, the electrodes being opposed to each other in a direction in which the crystal planes of the second inclined thin film are aligned inclined to the second main surface. Either one of the electrodes of the first electrode pair and either one of the electrodes of the second electrode pair are connected electrically to each other, and the first inclined thin film and the second inclined thin film form a series connection in which the crystal planes are inclined in a single direction.

The second thermoelectric conversion device of the present invention includes: a substrate; an inclined thin film disposed on a first main surface of the substrate, the inclined thin film having crystal planes serving as a factor in inducing anisotropy, and the crystal planes being aligned inclined to the first main surface; an electromagnetic wave reflection film disposed on a second main surface of the substrate opposite to the first main surface; and an electrode pair of electrodes disposed on the inclined thin film, the electrodes being opposed to each other in a direction in which the crystal planes of the inclined thin film are aligned inclined to the first main surface.

The first radiation detection method of the present invention is a radiation detection method of detecting an electromagnetic wave by a radiation detector. The radiation detector is the first radiation detector of the present invention. The method includes: a step of extracting a thermal electromotive force that is generated in the first inclined thin film by a temperature difference generated in the first inclined thin film by an electromagnetic wave that enters the radiation detector and a thermal electromotive force that is generated in the second inclined thin film by a temperature difference generated in the second inclined thin film by the electromagnetic wave using the other one of the electrodes of the first electrode pair that is not connected to the second electrode pair and the other one of the electrodes of the second electrode pair that is not connected to the first electrode pair; and a step of detecting the electromagnetic wave according to the extracted thermal electromotive force.

The second radiation detection method of the present invention is a radiation detection method of detecting an electromagnetic wave by a radiation detector. The radiation detector is the second radiation detector of the present invention. The method includes: a step of extracting a thermal electromotive force that is generated in the inclined thin film by a temperature difference generated in the inclined thin film by an electromagnetic wave that enters the radiation detector using the electrode pair; and a step of detecting the electromagnetic wave according to the extracted thermal electromotive force.

The first thermoelectric conversion device of the present invention has an inclined thin film (first inclined thin film)/substrate/inclined thin film (second inclined thin film) structure in which the inclined thin films are disposed on both of the main surfaces (the first main surface and the second main surface) of the substrate. With this structure, when an electromagnetic wave generates a temperature gradient in the inclined thin film and thereby generates a thermal electromotive force in the inclined thin film, the electromagnetic wave that has entered the device from one of the inclined thin films but has not been absorbed in that inclined thin film can be absorbed in the other inclined thin film. This allows the power of the electromagnetic that has entered the device to be converted efficiently into a thermal electromotive force.

The first radiation detector of the present invention has an inclined thin film (first inclined thin film)/substrate/inclined thin film (second inclined thin film) structure, as in the first thermoelectric conversion device of the present invention. Therefore, the power of the electromagnetic wave that has entered the radiation detector can be converted efficiently into a thermal electromotive force, and thus the sensitivity for detecting the electromagnetic wave can be increased. Furthermore, since the first radiation detection method of the present invention is a method using the first radiation detector, the electromagnetic wave can be detected with a high sensitivity.

The second thermoelectric conversion device of the present invention has a structure having the inclined thin film/substrate basic structure and additionally having an electromagnetic wave reflection film provided on the main surface (the second main surface) of the substrate on which the inclined thin film is not disposed. With this structure, when an electromagnetic wave generates a temperature gradient in the inclined thin film and thereby generates a thermal electromotive force in the inclined thin film, the electromagnetic wave that has entered the device from the inclined thin film side but has not been absorbed in the inclined thin film is reflected from the electromagnetic wave reflection film and again enters the inclined thin film. Therefore, the electromagnetic wave absorption efficiency of the inclined thin film is increased. When an electromagnetic wave enters an inclined thin film, the inclined thin film has a lower temperature at the interface between the inclined thin film and the substrate than at the interface between air and the inclined thin film, regardless of the direction in which the electromagnetic wave enters. Due to this phenomenon, the direction of an electromotive force generated in the inclined thin film by the absorption of the electromagnetic wave that directly enters the inclined thin film is the same as the direction of an electromotive force generated in the inclined thin film by the absorption of the electromagnetic wave that enters the inclined thin film after being reflected from the electromagnetic wave reflection film. This allows the power of the electromagnetic wave that has entered the device to be converted efficiently into a thermal electromotive force.

The second radiation detector of the present invention has the same structure as the second thermoelectric conversion device of the present invention. Therefore, the power of the electromagnetic wave that has entered the radiation detector can be converted efficiently into a thermal electromotive force, and thus the sensitivity for detecting the electromagnetic wave can be increased. Furthermore, since the second radiation detection method of the present invention is a method using the second radiation detector, the electromagnetic wave can be detected with a high sensitivity.

BRIEF DESCRIPTION OF THE DRAWINGS

FIG. 9 shows temporal changes in electromotive forces that are generated in an inclined thin film when an electromagnetic wave enters the device from the inclined thin film side and when an electromagnetic wave enters the device from the substrate side.

DETAILED DESCRIPTION OF THE INVENTION

Figure 1:
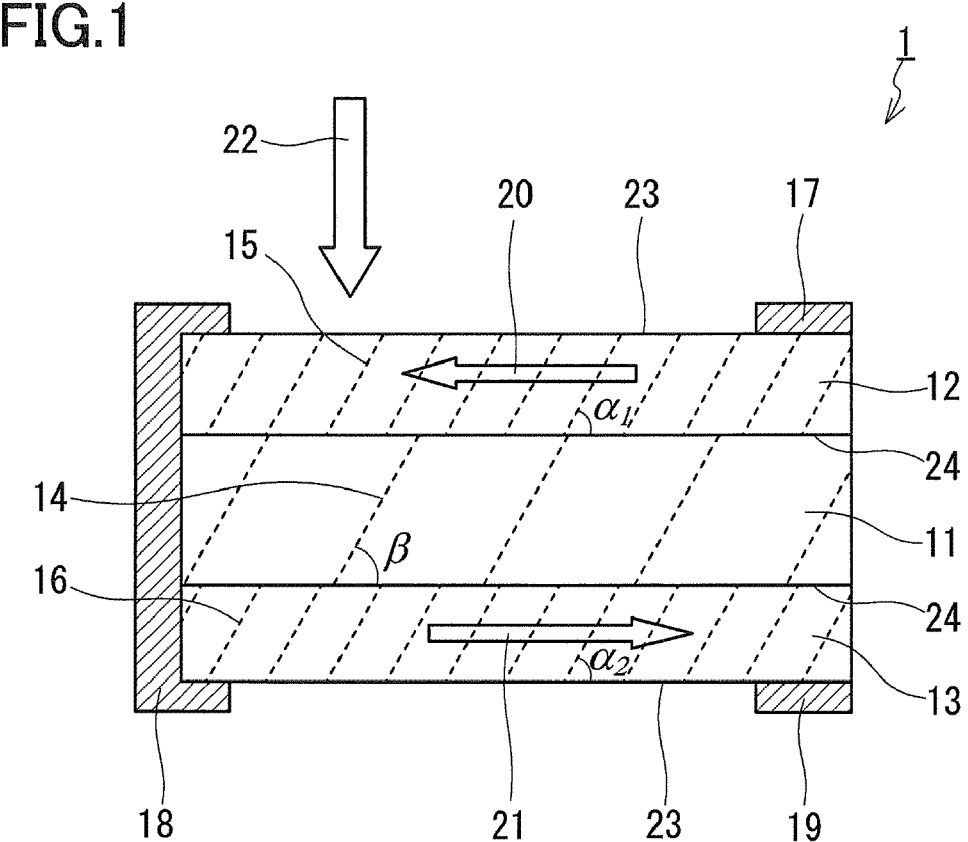
FIG. 1 is a cross-sectional view showing a configuration example of a radiation detector according to a first embodiment of the present invention.

Hereinafter, embodiments of the present invention will be described with reference to the drawings. The following embodiments are merely examples, and the present invention is not limited to the following embodiments. In the following embodiments, the same parts are designated with the same reference numerals and repetitive descriptions may be omitted.

First Embodiment

FIG. 1 is a cross-sectional view showing a configuration example of a radiation detector according to the first embodiment of the present invention. A radiation detector 1 of the present embodiment comprises an inclined substrate 11, a first inclined thin film 12 disposed on a first main surface of the inclined substrate 11, and a second inclined thin film 13 disposed on a second main surface of the inclined substrate 11 opposite to the first main surface. More specifically, the radiation detector 1 has an inclined thin film/substrate/inclined thin film heterostructure in which inclined thin films are provided on both of the front and back surfaces of the inclined substrate 11.

The low-index planes 14 of the inclined substrate 11 are inclined at an angle β with respect to the surface of the substrate. The first inclined thin film 12 has crystal planes serving as a factor inducing anisotropy (hereinafter abbreviated as "crystal planes") 15. The crystal planes 15 are inclined to the first main surface of the inclined substrate 11 and are aligned in parallel to each other. The second inclined thin film 13 has crystal planes 16 serving as a factor inducing anisotropy. The crystal planes 16 are inclined to the second main surface of the inclined substrate 11 and are aligned in parallel to each other.

A first extraction electrode 17 and a connection electrode 18 are disposed on the first inclined thin film 12 in such a manner that they are opposed to each other in the direction 20 in which the crystal planes 15 are aligned inclined. The first extraction electrode 17 is disposed at one end of the first inclined thin film 12 in the direction 20. The connection electrode 18 is disposed at the other end of the first inclined thin film 12 in the direction 20. The connection electrode 18 is configured to extend from the end of the first inclined thin film 12 to the end of the second inclined thin film 13 along the side surface of the radiation detector 1. Furthermore, a second extraction electrode 19 is disposed on the other end of the second inclined thin film 13 that is opposite to the position of the connection electrode 18 on the second inclined thin film 13 in the direction 21 in which the crystal planes 16 are aligned inclined. More specifically, in the present embodiment, the first extraction electrode 17 and the connection electrode 18 correspond to the first electrode pair in the radiation detector of the present invention, and the connection electrode 18 and the second extraction electrode 19 correspond to the second electrode pair in the radiation detector of the present invention.

When an electromagnetic wave 22 enters the first inclined thin film 12, a temperature gradient occurs in the thickness direction in the first inclined thin film 12. As a result, an electromotive force is generated in the direction 20 in which the crystal planes 15 are aligned inclined, that is, the direction in which the first extraction electrode 17 and the connection electrode 18 that constitute the first electrode pair are opposed to each other. The crystal planes 15 are inclined at an inclination angle $\alpha_1$ with respect to the direction in which the first extraction electrode 17 and the connection electrode 18 are opposed to each other.

On the other hand, when the electromagnetic wave 22 enters the second inclined thin film 13, a temperature gradient occurs in the thickness direction in the second inclined thin film 13. As a result, an electromotive force is generated in the direction 21 in which the crystal planes 16 are aligned inclined, that is, the direction in which the connection electrode 18 and the second extraction electrode 19 that constitute the second electrode pair are opposed to each other. The crystal planes 16 are inclined at an inclination angle $\alpha_2$ with respect to the direction in which the connection electrode 18 and the second extraction electrode 19 are opposed to each other.

The inclination angle $\alpha_1$ of the crystal planes 15 of the first inclined thin film 12 and the inclination angle $\alpha_2$ of the crystal planes 16 of the second inclined thin film 13 are determined according to the inclination angle β of the low-index planes 14 of the inclined substrate 11, and $\alpha_1$ and $\alpha_2$ satisfy $\alpha_1$, $\alpha_2 = \beta \pm \theta$, where θ is 0 to 10 degrees. In the radiation detector 1, the inclination angle $\alpha_1$ and the inclination angle $\alpha_2$ can be not less than 10° and not more than 80°, and is preferably not less than 25° and not more than 80°. This allows the radiation detector 1 to have a high detection sensitivity. In the case where the first inclined thin film 12 and the second inclined thin film 13 are made of the same thermoelectric conversion material, the angle $\alpha_1$ and the angle $\alpha_2$ are equal to each other.

In the radiation detector 1 configured as described above, the crystal planes 15 of the first inclined thin film 12 and the crystal planes 16 of the second inclined thin film 13 are inclined in a single direction in a path in which an electric current flows from the first extraction electrode 17, through the first inclined thin film 12, the connection electrode 18, and the second inclined thin film 13, down to the second extraction electrode 19 (i.e., in the path in which an electric current flows, the crystal planes are inclined in a single downward (or upward) direction). In other words, the first inclined thin film 12 and the second inclined thin film 13 form a series connection in which the crystal planes are inclined in the single direction.

When the electromagnetic wave 22 enters this radiation detector 1 through the surface of the first inclined thin film 12, a part of the electromagnetic wave 22 is absorbed in the first inclined thin film 12 and the unabsorbed part as a transmitted wave enters the inclined substrate 11 and the second inclined thin film 13. Apart of the electromagnetic wave 22 as the transmitted wave that has entered the second inclined thin film 13 is further absorbed in the second inclined thin film 13. Although the details are described in the examples below, when the electromagnetic wave 22 is absorbed in the inclined thin films 12 and 13, temperature gradients occur in these inclined thin films 12 and 13 in such a manner that the temperatures are higher at the interfaces 23 between air and the inclined thin films 12 and 13 and lower at the interfaces 24 between the inclined substrate 11 and the inclined thin films 12 and 13, regardless of the traveling direction of the electromagnetic wave 22. Therefore, when the electromagnetic wave 22 enters the above structure through the surface of the first inclined thin film 12, both of the first inclined thin film 12 and the second inclined thin film 13 have higher temperatures at the interfaces 23 between air and the inclined thin films 12 and 13 than at the interfaces 24 between the inclined substrate 11 and the inclined thin films 12 and 13. As a result, electromotive forces are generated, and thereby the connection electrode 18 side has a higher potential than the first extraction electrode 17 side in the first inclined thin film 12, and the second extraction electrode 19 side has a higher potential than the connection electrode 18 side in the second inclined thin film 13. The electromotive forces are generated in these directions in the case where the first inclined thin film 12 and the second inclined thin film 13 are made of a p-type material. The radiation detector 1 detects the electromagnetic wave by measuring the potential difference between the first extraction electrode 17 and the second extraction electrode 19. More specifically, the radiation detector 1 uses the sum of the electromotive forces that are generated in both of the first inclined thin film 12 and the second inclined thin film 13 to detect the electromagnetic wave.

The radiation detector 1 detects the electromagnetic wave by reading the thermal electromotive forces generated by the electromagnetic wave 22 that has entered the detector 1, with use of the first extraction electrode 17 and the second extraction electrode 19. Therefore, the radiation detector 1 having a configuration in which the inclined thin films are provided on both of the main surfaces of the substrate has a higher sensitivity, by the electromotive force generated in the second inclined thin film 13, than the conventional configuration in which the inclined thin film is provided on only one of the main surfaces of the substrate.

Next, the materials and fabrication methods of the constituent elements of the radiation detector 1 are described specifically.

Substrates made of $Al_2O_3$ (sapphire), $SrTiO_3$, MgO, $LaAlO_3$, $SiO_2$, Si, etc. can be used as the inclined substrate 11.

The materials for the first inclined thin film 12 and the second inclined thin film 13 are not particularly limited as long as they are materials having anisotropic Seebeck coefficients (i.e., materials exhibiting the anisotropic thermoelectric effect). Specifically, layered cobalt oxides such as $Ca_xCoO_2$, $Sr_xCoO_2$, $Na_xCoO_2$, $Ca_3Co_4O_9$, and $Sr_3Co_4O_9$, (where x satisfies $0.15 \leq x \leq 0.5$ in $Ca_xCoO_2$ and $Sr_xCoO_2$, and $0.15 \leq x \leq 1$ in $Na_xCoO_2$), or layered perovskite materials such as $YBa_2Cu_3O_{7-\delta}$ (where $\delta$ represents the amount of oxygen deficiency and satisfies $0 \leq \delta \leq 0.7$) are suitably used. The first inclined thin film 12 and the second inclined thin film 13 may be formed of the same thermoelectric conversion material, or different thermoelectric conversion materials.

The method of fabricating the first inclined thin film 12 and the second inclined thin film 13 is not particularly limited. Various methods can be used, including those using vapor phase growth, such as sputtering, vapor deposition, laser ablation, and chemical vapor deposition, or those using growth from a liquid phase.

The materials of the first extraction electrode 17, the connection electrode 18, and the second extraction electrode 19 in the radiator detector 1 are not particularly limited as long as they are materials having good electrical conductivity. Specifically, metals such as Cu, Ag, Mo, Al, Ti, Cr, Au, Pt, and In, nitrides such as TiN, and oxides such as indium tin oxide (ITO) and $SnO_2$ can be suitably used. A solder or a conductive paste also can be used.

Various methods can be used to fabricate the first extraction electrode 17 and the second extraction electrode 19. For example, methods such as application of a conductive paste, plating, thermal spraying, and solder joint with a solder can be used in addition to those using vapor phase growth, such as a vapor deposition and sputtering.

Various methods can be used to fabricate the connection electrode 18. For example, methods such as application of a conductive paste, plating, thermal spraying, solder joint with a solder, and pressure welding or welding of a plate, a foil, or a wire rod can be used in addition to those using vapor phase growth, such as vapor deposition and sputtering. Furthermore, the path for connecting the first inclined thin film 12 and the second inclined thin film 13 by the connection electrode 18 is not limited to the side surface of the inclined substrate 11. For example, the connection electrode 18 can be provided in such a manner that the first inclined thin film 12 and the second inclined thin film 13 are connected via a through-hole formed in the inclined substrate 11, or it also can be spaced from the inclined substrate 11 if it is a self-supporting member like a wire rod.

Another configuration example of the radiator detector of the present embodiment also is described. A radiation detector 2 shown in FIG. 2 has a configuration in which an insulating film 25 disposed on the surface of the second inclined thin film 13 and an electromagnetic wave reflection film 26 disposed on the insulating film 25 are added to the radiation detector 1 shown in FIG. 1. The electromagnetic wave reflection film 26 is a film having a high reflectance (for example, a reflectance of 75% or higher) with respect to an electromagnetic wave to be measured. With this configuration, the electromagnetic wave 22 that has entered the radiation detector 2 through the surface of the first inclined thin film 12 can be utilized more efficiently. More specifically, a part of the electromagnetic wave 22 that has entered the radiation detector 2 is not absorbed in the first inclined thin film 12, the inclined substrate 11, and the second inclined thin film 13, and this remaining electromagnetic wave is reflected by the electromagnetic wave reflection film 26 and again enters the second inclined thin film 13 and the first inclined thin film 12. The reflected electromagnetic wave is further converted into a thermal electromotive force in the second inclined thin film 13 and the first inclined thin film 12. As a result, the radiation detector 2 has an even higher sensitivity than the configuration without the electromagnetic wave reflection film 26. In the case where the electromagnetic wave reflection film 26 is made of an insulating material, the insulating film 25 is unnecessary. More specifically, in the configuration, like the radiation detector 2, in which the electromagnetic wave 22 enters from the first inclined thin film 12 side, the electromagnetic wave reflection film 26 can be disposed on the opposite side to the first inclined thin film 12 with respect to the second inclined thin film 13.

The material of the insulating film 25 is not particularly limited as long as it is a material having poor electrical conductivity. Specifically, the insulating film 25 may be formed of a semiconductor such as Si or Ge, or an insulating oxide material such as $Al_2O_3$, $SiO_2$, MgO, or $SrTiO_3$. It is desirable that the insulating film 25 be formed of a material having a high transmittance with respect to an electromagnetic wave to be measured. Furthermore, the material of the electromagnetic wave reflection film 26 is not particularly limited as long as it is a material having a high reflectance with respect to an electromagnetic wave to be measured. Various methods can be used to fabricate the insulating film 25 and the electromagnetic wave reflection film 26. For example, methods such as plating and thermal spraying can be used in addition to those using vapor phase growth, such as a vapor deposition and sputtering.

The method of producing the radiation detector of the present embodiment is not particularly limited to the methods described above as long as it is a method that allows an inclined thin film/substrate/inclined thin film heterostructure to be obtained.

Second Embodiment

Figure 3:
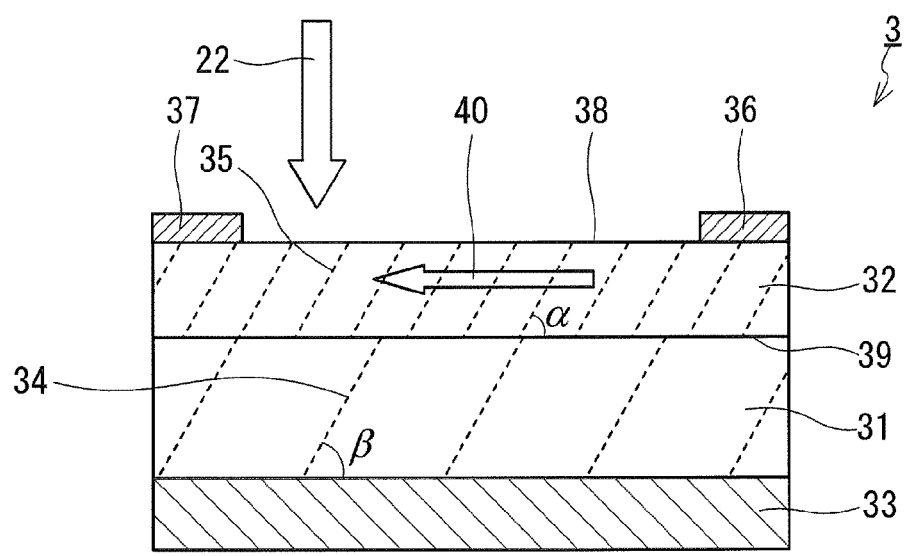
FIG. 3 is a cross-sectional view showing a configuration example of a radiation detector according to a second embodiment of the present invention.

FIG. 3 is a cross-sectional view showing a configuration example of a radiation detector according to a second embodiment of the present invention. A radiation detector 3 of the present embodiment comprises an inclined substrate 31, an inclined thin film 32 disposed on a first main surface of the inclined substrate 31, and an electromagnetic wave reflection film 33 disposed on a second main surface of the inclined substrate 31 opposite to the first main surface.

The low-index planes 34 of the inclined substrate 31 are inclined at an angle β with respect to the surface of the substrate. The inclined thin film 32 has crystal planes serving as a factor inducing anisotropy (hereinafter abbreviated as "crystal planes") 35. The crystal planes 35 are inclined to the first main surface of the inclined substrate 31 and are aligned in parallel to each other.

A first extraction electrode 36 and a second electrode 37 as an electrode pair are provided on the inclined thin film 32. The first extraction electrode 36 and the second extraction electrode 37 are opposed to each other in the direction 40 in which the crystal planes 35 of the inclined thin film 32 are aligned inclined to the first main surface.

When the electromagnetic wave 22 enters the inclined thin film 32, a temperature gradient occurs in the thickness direction of the inclined thin film 32. As a result, an electromotive force is generated in the direction 40 in which the crystal planes 35 are aligned inclined, that is, the direction in which the first extraction electrode 36 and the second extraction electrode 37 that constitute the electrode pair are opposed to each other. The crystal planes 35 are inclined at an inclination angle α with respect to the direction in which the first extraction electrode 36 and the second extraction electrode 37 are opposed to each other.

The inclination angle α of the crystal planes 35 of the inclined thin film 32 is determined according to the inclination angle β of the low-index planes 34 of the inclined substrate 31, and α satisfies α=β±θ, where θ is 0 to 10 degrees. In the radiation detector 3, the inclination angle α can be not less than 10° and not more than 80°, and is preferably not less than 25° and not more than 80°. This allows the radiation detector 3 to have a high detection sensitivity.

Since the inclined substrate 31 has the same configuration as the inclined substrate 11 that has been described in the first embodiment, the same substrate can be used for both of them.

Since the inclined thin film 32 has the same configuration as the first inclined thin film 12 and the second inclined thin film 13 that have been described in the first embodiment, the same material and fabrication method can be used for both of them.

The material of the electromagnetic wave reflection film 33 is not particularly limited as long as the electromagnetic wave reflection film 33 is a film having a high reflectance (for example, a reflectance of 75% or higher) with respect to an electromagnetic wave to be measured. Various methods can be used to fabricate the electromagnetic wave reflection film 33. For example, methods such as plating and thermal spraying can be used in addition to those using vapor phase growth, such as a vapor deposition and sputtering.

The material and fabrication method for the first extraction electrode 17 and the second extraction electrode 19 that have been described in the first embodiment also can be used for the first extraction electrode 36 and the second extraction electrode 37.

As also described in the first embodiment, when the electromagnetic wave 22 is absorbed in the inclined thin film 32, a temperature gradient occurs in the inclined thin film 32 in such a manner that the temperature is higher at the interface 38 between air and the inclined thin film 32 and lower at the interface 39 between the inclined substrate 31 and the inclined thin film 32, regardless of the traveling direction of the electromagnetic wave 22. Therefore, the direction of the temperature gradient caused by the electromagnetic wave 22 that enters the inclined thin film 32 through the interface 38 between air and the inclined thin film 32 and is absorbed in the inclined thin film 32 is the same as the direction of the temperature gradient caused by the electromagnetic wave that is reflected from the electromagnetic wave reflection film 33 after passing through the inclined thin film 32 and the inclined substrate 31, again enters the inclined thin film 32 through the interface 39 between the inclined thin film 32 and the inclined substrate 31, and is absorbed in the inclined thin film 32. Therefore, thermal electromotive forces are generated in the same direction by these temperature gradients. As described above, in the radiation detector 3, the remaining electromagnetic wave that has once passed through the inclined thin film 32 is reflected by the electromagnetic wave reflection film 33 and again enters the inclined thin film 32. Thus, the remaining electromagnetic wave is utilized effectively. As a result, the radiation detector 3 has a higher sensitivity than the conventional radiation detector without the electromagnetic wave reflection film 33. The radiation detector 3 detects the electromagnetic wave by measuring the potential difference between the first extraction electrode 36 and the second extraction electrode 37.

Third Embodiment

Figure 4A:
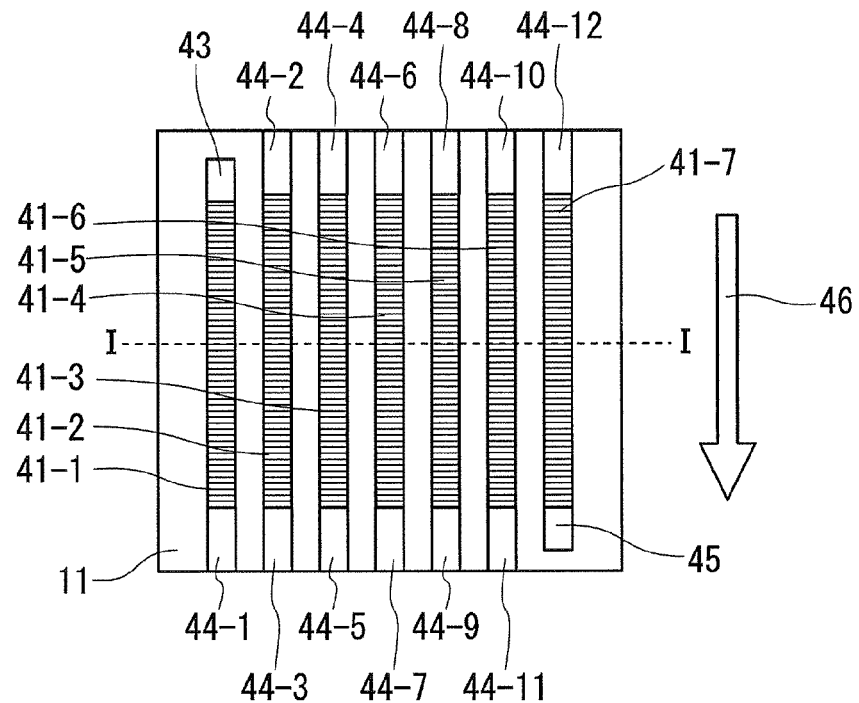
FIG. 4A is a plan view showing a surface in which a first inclined thin film is formed in a radiation detector according to a third embodiment of the present invention.
Figure 4B:
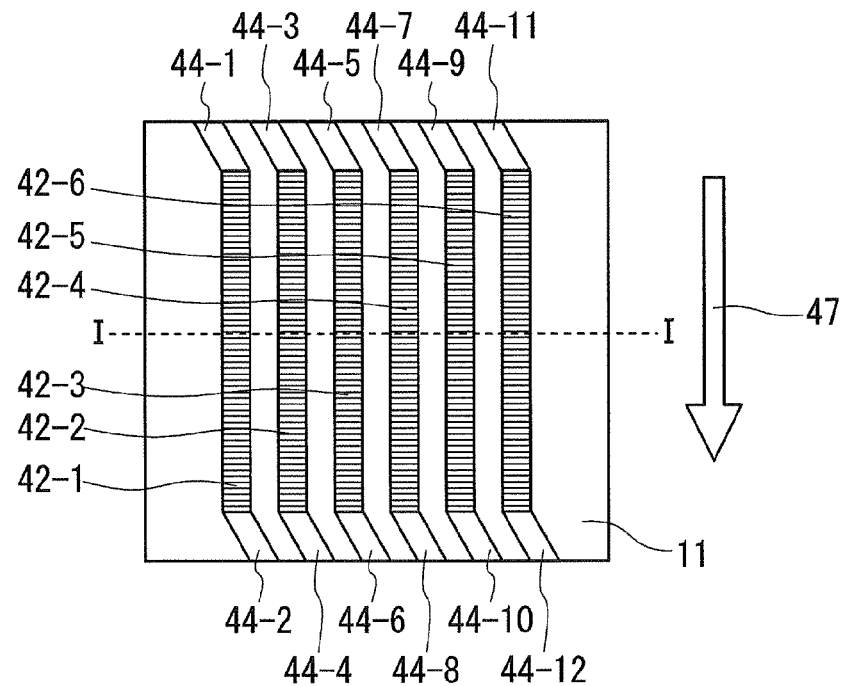
FIG. 4B is a plan view showing a surface in which a second inclined thin film is formed in the radiation detector according to the third embodiment of the present invention.

A radiation detector of the third embodiment has an inclined thin film (first inclined thin film)/substrate/inclined thin film (second inclined thin film) structure, which is fabricated in the same manner as in the first embodiment. Furthermore, both of the first inclined thin film and the second inclined thin film are patterned into separate lines. The patterned lines are parallel to each other. FIG. 4A is a plan view showing a surface on which the first inclined thin film is formed in the radiation detector according to the third embodiment, and FIG. 4B is a plan view showing a surface on which the second inclined thin film is formed in the radiation detector according to the third embodiment. All of the crystal planes serving as a factor inducing anisotropy of the first inclined thin film and the second inclined thin film are inclined in a single direction because the direction of inclination is limited by the inclined substrate.

As shown in FIG. 4A, the first inclined thin film disposed on the first main surface of the inclined substrate 11 is formed of separate lines of a first line 41-1, a second line 41-2, a third line 41-3, . . . etc. A first electrode pair (consisting of a first extraction electrode 43 and a first connection electrode 44-1) are disposed on the first line 41-1 in such a manner that they are opposed to each other in the direction 46 in which the crystal planes of the first line 41-1 are aligned inclined to the first main surface. A first electrode pair (consisting of a second connection electrode 44-2 and a third connection electrode 44-3) are disposed on the second line 41-2 in such a manner that they are opposed to each other in the direction 46 in which the crystal planes of the second line 41-2 are aligned inclined to the first main surface. Each first electrode pair also is disposed on the third line 41-3, the fourth line 41-4, . . . etc. in such a manner that the electrodes of the pair are opposed to each other in the direction 46 in which the crystal planes of each line are aligned inclined. In the present embodiment, a twelfth connection electrode 44-12 and an extraction electrode 45 as a first electrode pair are disposed on the seventh line 41-7 that is the final line of the first inclined thin film.

As shown in FIG. 4B, the second inclined thin film disposed on the second main surface of the inclined substrate 11 is formed of separate lines of a first line 42-1, a second line 42-2, a third line 42-3, . . . etc. A second electrode pair (consisting of a first connection electrode 44-1 and a second connection electrode 44-2) are disposed on the first line 42-1 in such a manner that they are opposed to each other in the direction 47 in which the crystal planes of the first line 42-1 are aligned inclined to the second main surface. A second electrode pair (consisting of a third connection electrode 44-3 and a fourth connection electrode 44-4) are disposed on the second line 42-2 in such a manner that they are opposed to each other in the direction 47 in which the crystal planes of the second line 42-2 are aligned inclined to the second main surface. Each second electrode pair also is disposed on the third line 42-3, the fourth line 42-4, . . . etc. in such a manner that the electrodes of the pair are opposed to each other in the direction 47 in which the crystal planes are aligned inclined.

As shown in FIG. 4A and FIG. 4B, the first line 41-1 of the first inclined thin film is connected to the first line 42-1 of the second inclined thin film through the first connection electrode 44-1. The first connection electrode 44-1 is configured to extend from the end of the first line 41-1 of the first inclined thin film to the end of the first line 42-1 of the second inclined thin film along the side surface of the radiation detector. Furthermore, the first line 42-1 of the second inclined thin film is connected to the second line 41-2 of the first inclined thin film through the second connection electrode 44-2. The second connection electrode 44-2 is configured to extend to the end of the second line 41-2 of the first inclined thin film along the side surface of the radiation detector opposite to the side surface where the first connection electrode 44-1 extends. The lines of the first inclined thin film and the lines of the second inclined thin film form a plurality of series connections to be a series-connected body. An electromotive force that is generated by the entry of an electromagnetic wave is extracted through the first extraction electrode 43 and the second extraction electrode 45 disposed on both ends of the series-connected body.

The magnitude of the electromotive force that is generated by the anisotropic thermoelectric effect does not depend on the width of the lines of an inclined thin film, but depends on the total length of the lines of the inclined thin film between the measurement terminals. Therefore, when a plurality of (N) inclined thin film lines in which the crystal planes are inclined in a single direction are connected in series, as in the radiation detector of the present embodiment, the resulting electromotive force is N times greater than that generated in a radiation detector having one inclined thin film line.

Furthermore, the radiation detector of the present embodiment has a configuration in which the inclined thin films are provided on both of the front and back surfaces of the inclined substrate 11. This configuration allows a series connection of the lines of the inclined thin films to be formed by using the side surfaces of the radiation detector, for example, the first connection electrode 44-1, the second connection electrode 44-2, . . . etc. This eliminates the need to reduce the number of inclined thin film lines to arrange the connection electrodes in a limited area. Therefore, more lines can be connected in series than in the conventional configuration, and thus a greater electromotive force can be obtained.

Figure 5:
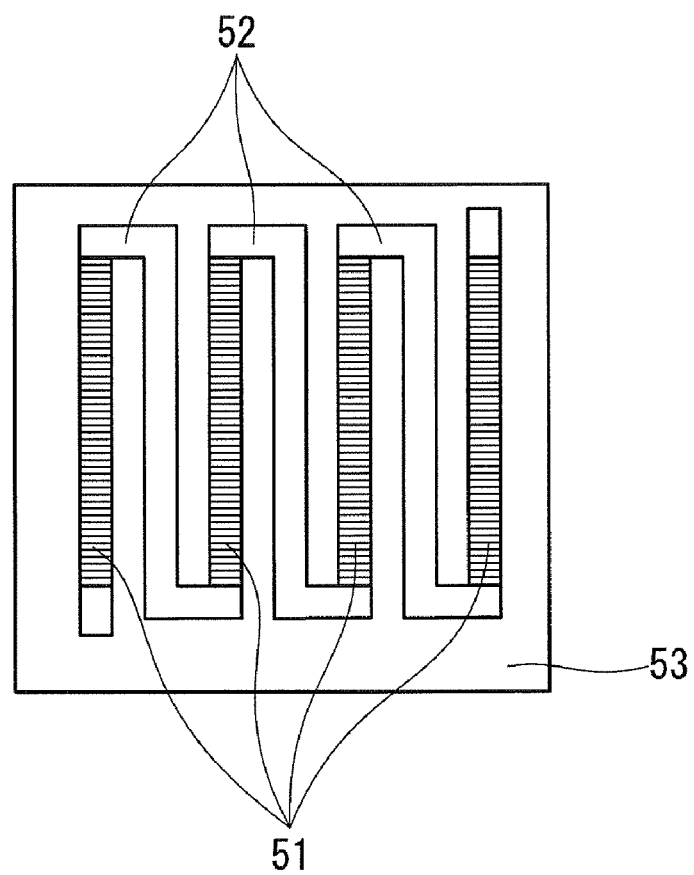
FIG. 5 is a plan view of a radiation detector for explaining a series connection structure of an inclined thin film formed only on one surface of a substrate.

More specifically, in order to form a series connection of lines on one of the main surfaces of the inclined substrate, it is necessary to pattern the inclined thin film formed on the inclined substrate into parallel lines and to connect adjacent lines so as to prevent the electromotive forces from cancelling each other. On the other hand, the inclination direction of the crystal planes of the inclined thin film generally depends on the inclination direction of the low-index planes 116 of the inclined substrate 111 (i.e., the direction 120 in which the planes 116 are aligned inclined) (see K. Takahashi et al., "Tailoring of inclined crystal orientation in layered cobaltite thin films for the development of off-diagonal thermoelectric effect", Applied Physics Letters 95, 051913 (2009)). Therefore, when the inclined thin film formed on one surface of the inclined substrate is patterned into parallel lines, all of the lines are arranged thereon in such a manner that their crystal planes are inclined in the same direction. In order to form a series connection of all the lines arranged in this manner so as to prevent the electromotive forces from cancelling each other, it is necessary to form connection electrodes 52 on an inclined substrate 53 in such a manner that each of them weaves its way between the adjacent lines 51 of the inclined thin film, as shown in FIG. 5. As a result, the space devoted to the lines 51 of the inclined thin film is reduced by the width of the connection electrodes 52. Therefore, the total number of the lines 51 of the inclined thin film that can be patterned on the inclined substrate 53 (i.e., the total number of lines that can be connected in series) is limited. Let us consider the case where an electromagnetic wave enters a series-connected body as shown in FIG. 5. In this case, the electromagnetic wave that has entered the region covered by the lines 51 of the inclined thin film is converted into a thermal electromotive force, but the electromotive wave that has entered other regions (i.e., electrode regions and regions where neither the lines nor the electrodes are arranged) is not converted into a thermal electromotive force.

As is clear from a comparison between FIGS. 4A and 4B and FIG. 5, series-connected body of inclined thin film lines formed on both of the front and back surfaces of the inclined substrate can have a much larger number of series-connected inclined thin film lines than a series-connected body formed on only one of the surfaces of the inclined substrate. More specifically, the former series-connected body can have about four times more series connections in total than the latter series-connected body formed on only one of the surfaces of the inclined substrate. Thus, the sensitivity can be improved significantly.

Figure 6:
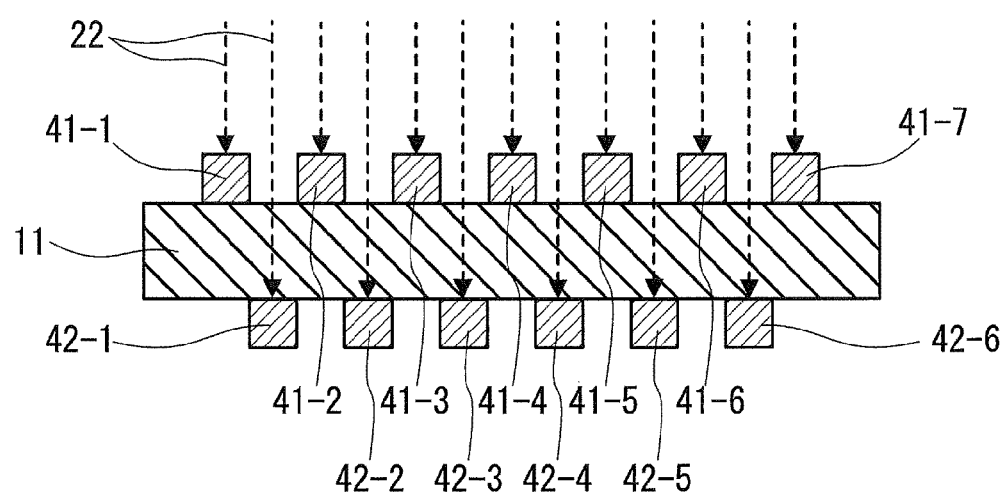
FIG. 6 is a cross-sectional view showing a configuration example of the radiation detector according to the third embodiment of the present invention, in which lines of a first inclined thin film and lines of a second inclined thin film are arranged so as not to overlap each other.
Figure 7:
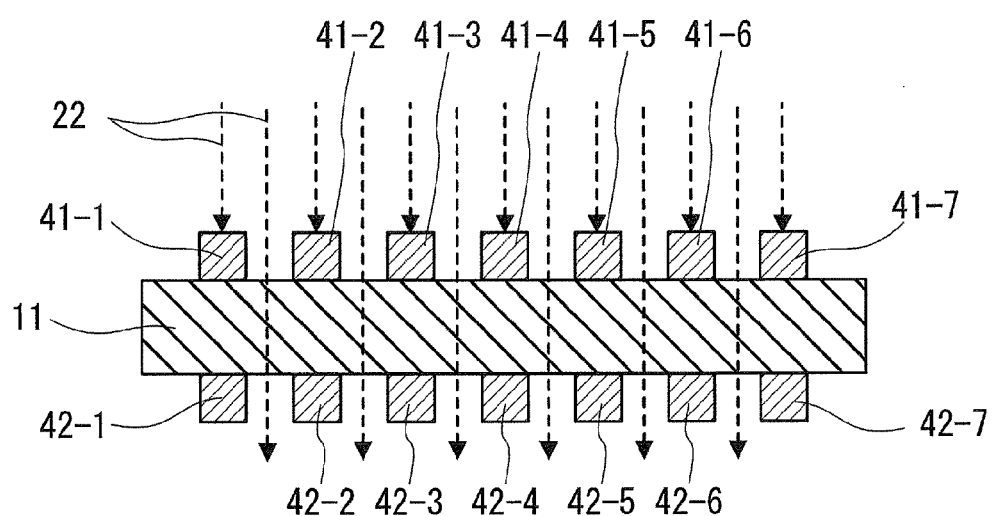
FIG. 7 is a cross-sectional view showing a configuration example of the radiation detector according to the third embodiment of the present invention, in which the lines of the first inclined thin film and the lines of the second inclined thin film are arranged so as to overlap each other.

When the lines 41-1, 41-2, . . . etc. of the first inclined thin film and the lines 42-1, 42-2, . . . etc. of the second inclined thin film are arranged so as not to overlap each other (see FIG. 6) in a cross section taken along the line I-I of the radiation detector shown in FIG. 4A and FIG. 4B, the electromagnetic wave 22 that has entered the device is utilized more efficiently and thus a higher sensitivity is obtained than when the lines are arranged so as to overlap each other (see FIG. 7). This is because when the lines of the first inclined thin film and the lines of the second inclined thin film are arranged so as to overlap each other, the electromagnetic wave 22 that has entered the empty space between the adjacent lines are not converted into a thermal electromotive force. The lines of the first inclined thin film and the lines of the second inclined thin film need not be designed to have no overlap between them. If the lines of the first inclined thin film and the lines of the second inclined thin film are arranged so as to have an area where the lines do not overlap, the electromagnetic wave can be utilized more efficiently than when the lines are arranged so as to overlap completely with each other.

Figure 2:
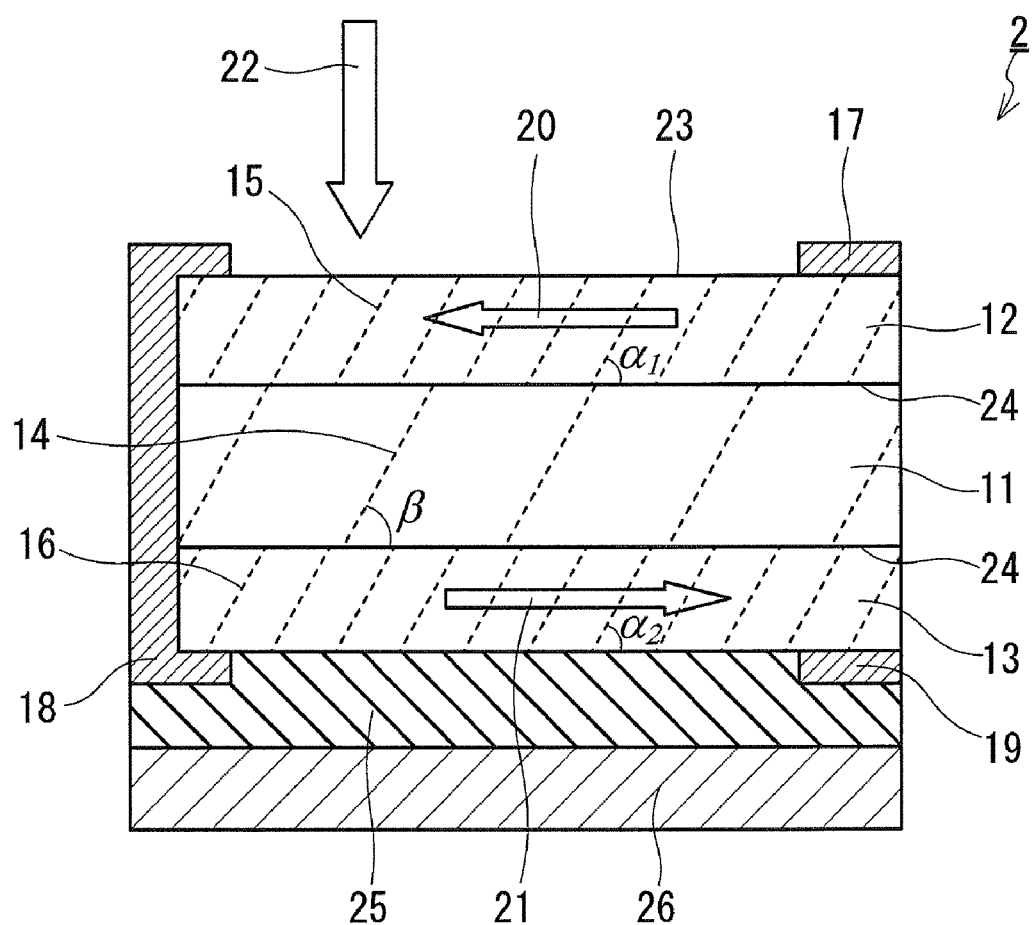
FIG. 2 is a cross-sectional view showing another configuration example of the radiation detector according to the first embodiment of the present invention.

A configuration, as shown in FIG. 2, in which an electromagnetic wave reflection film is provided on the surface of the second inclined thin film with an insulating film interposed therebetween, also can be employed in the radiation detector of the present embodiment in which the inclined thin film lines are connected in series. Since the addition of the electromagnetic wave reflection film allows an electromagnetic wave that has entered the radiation detector to be utilized more effectively, the sensitivity is further improved. As described in the first embodiment, in the case where the electromagnetic wave reflection film has insulating properties, it may be disposed directly on the second inclined thin film without providing the insulating film.

The lines 41-1, 41-2, . . . etc. of the first inclined thin film in the radiation detector of the present embodiment can be fabricated using the same material and the same fabrication method as those of the first inclined thin film 12 that have been described in the first embodiment.

The lines 42-1, 42-2, . . . etc. of the second inclined thin film in the radiation detector of the present embodiment can be fabricated using the same material and the same fabrication method as those of the second inclined thin film 13 that have been described in the first embodiment.

The first extraction electrode 43, the connection electrodes (the first connection electrode 44-1, the second connection electrode 44-2, . . . etc.), and the second extraction electrode 45 in the radiation detector of the present embodiment can be fabricated using the same materials and the same fabrication methods as those of the first extraction electrode 17, the connection electrode 18, and the second extraction electrode 19, respectively, that have been described in the first embodiment. Furthermore, the connection electrodes also can be configured in the same manner as the connection electrode 18 of the first embodiment. For example, a configuration using a through-hole formed in the inclined substrate 11 or the like can be used.

Fourth Embodiment

A radiation detector of the fourth embodiment has an inclined thin film/substrate/electromagnetic wave reflection film structure that is fabricated in the same manner as in the second embodiment. Furthermore, the inclined thin film is patterned into separate lines. The patterned lines are parallel to each other. The lines of the inclined thin film are connected in series by connection electrodes that are extended to the back surface (second main surface) of the inclined substrate. The connection electrodes on the back surface of the inclined substrate serve as an electromagnetic wave reflection film.

Figure 8A:
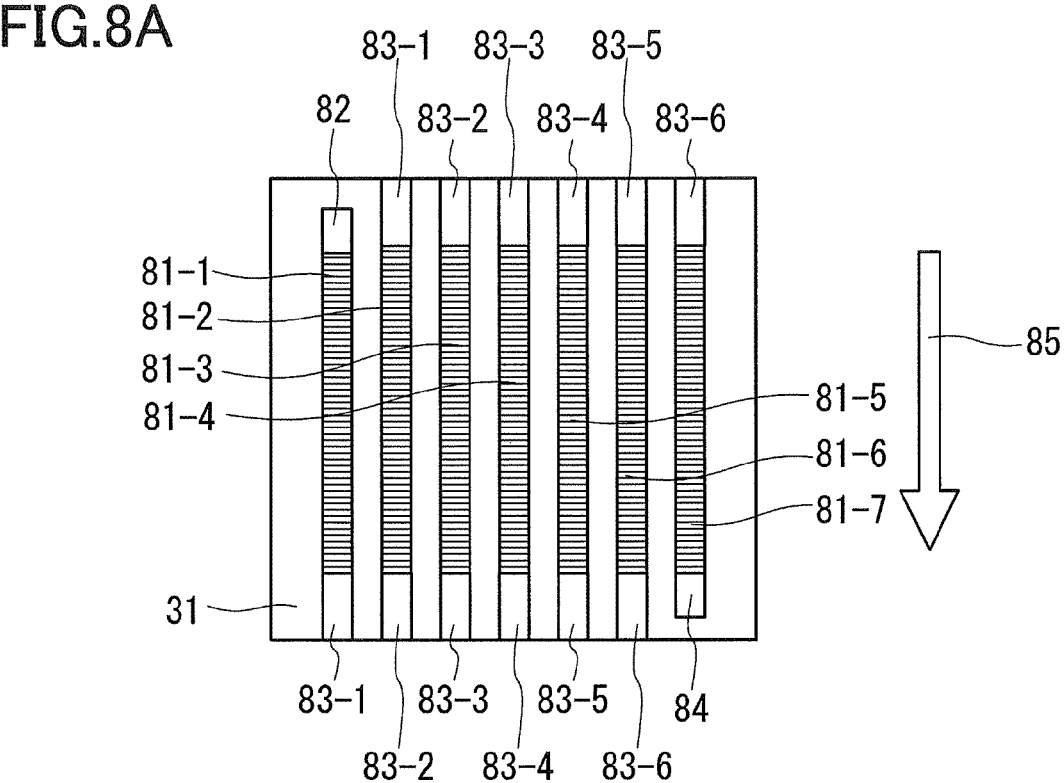
FIG. 8A is a plan view showing a surface in which an inclined thin film is formed in a radiation detector according to a fourth embodiment of the present invention.
Figure 8B:
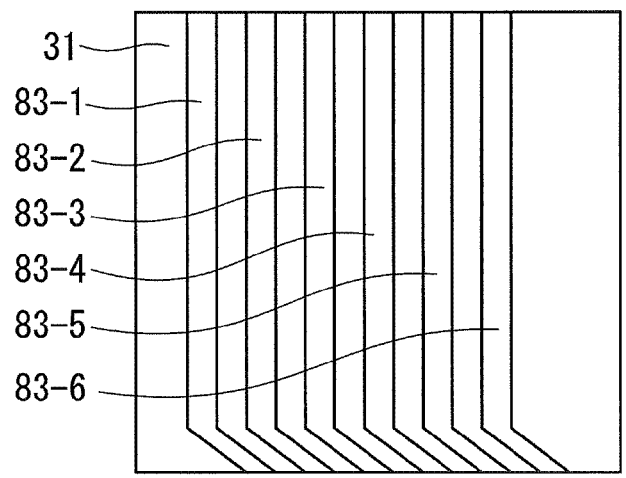
FIG. 8B is a plan view showing a surface in which connection electrodes (an electromagnetic reflection film) are formed in the radiation detector according to the fourth embodiment of the present invention.

FIG. 8A is a plan view showing a surface on which the inclined thin film is formed in the radiation detector according to the fourth embodiment, and FIG. 8B is a plan view showing a surface on which connection electrodes (an electromagnetic reflection film) are formed in the radiation detector according to the fourth embodiment. All of the crystal planes serving as a factor inducing anisotropy of the inclined thin film are inclined in a single direction because the direction of inclination is limited by the inclined substrate.

As shown in FIG. 8A, the inclined thin film disposed on the first main surface of the inclined substrate 31 is formed of separate lines of a first line 81-1, a second line 81-2, a third line 81-3, . . . etc. An electrode pair (consisting of a first extraction electrode 82 and a first connection electrode 83-1) are disposed on the first line 81-1 in such a manner that they are opposed to each other in the direction 85 in which the crystal planes of the first line 81-1 are aligned inclined to the first main surface. An electrode pair (consisting of a first connection electrode 83-1 and a second connection electrode 83-2) are disposed on the second line 81-2 in such a manner that they are opposed to each other in the direction 85 in which the crystal planes of the second line 81-2 are aligned inclined to the first main surface. Each electrode pair also is disposed on the third line 81-3, the fourth line 81-4, . . . etc. in such a manner that the electrodes of the pair are opposed to each other in the direction 85 in which the crystal planes are aligned inclined. In the present embodiment, a sixth connection electrode 83-6 and a second extraction electrode 84 as an electrode pair are disposed on the seventh line 81-7 that is the final line of the inclined thin film.

As shown in FIG. 8B, a first connection electrode 83-1, a second connection electrode 83-2, . . . etc. that are extended to the second main surface of the inclined substrate 31 for series connections of the inclined thin film lines are disposed thereon. These connection electrodes also serve as an electromagnetic wave reflection film. Therefore, the connection electrodes in the present embodiment are required not only to be formed of a material having good electrical conductivity but also to have a high reflectance (for example, a reflectance of 75% or higher) with respect to an electromagnetic wave to be measured. Therefore, it is desirable to use a material like a metal having a high reflectance with respect to an electromagnetic wave to be measured for the connection electrodes.

According to the present embodiment, the remaining electromagnetic wave that has passed through the lines (the first line 81-1, the second line 81-2, . . . etc.) of the inclined thin film is reflected by the connection electrodes (the first connection electrode 83-1, the second connection electrode 83-2, . . . etc.) on the back surface and again enters the inclined thin film. Therefore, the electromagnetic wave that has entered the radiation detector can be converted efficiently into a thermal electromotive force, and thus the sensitivity of the radiation detector can be improved.

The embodiments of the radiation detector of the present invention that utilizes the configuration of the thermoelectric conversion device of the present invention having an inclined thin film/substrate/inclined thin film structure or an inclined thin film/substrate/electromagnetic wave reflection film structure have been described in the above first to fourth embodiments. These descriptions also can be applied to the embodiments of the thermoelectric conversion device of the present invention. The configuration of the thermoelectric conversion device of the present invention can be used not only in a radiation detector but also in, for example, a thermoelectric generation device, a laser power meter, etc.

EXAMPLES

Hereinafter, further specific examples of the present invention are described.

Preliminary Experiments

Figure 11:
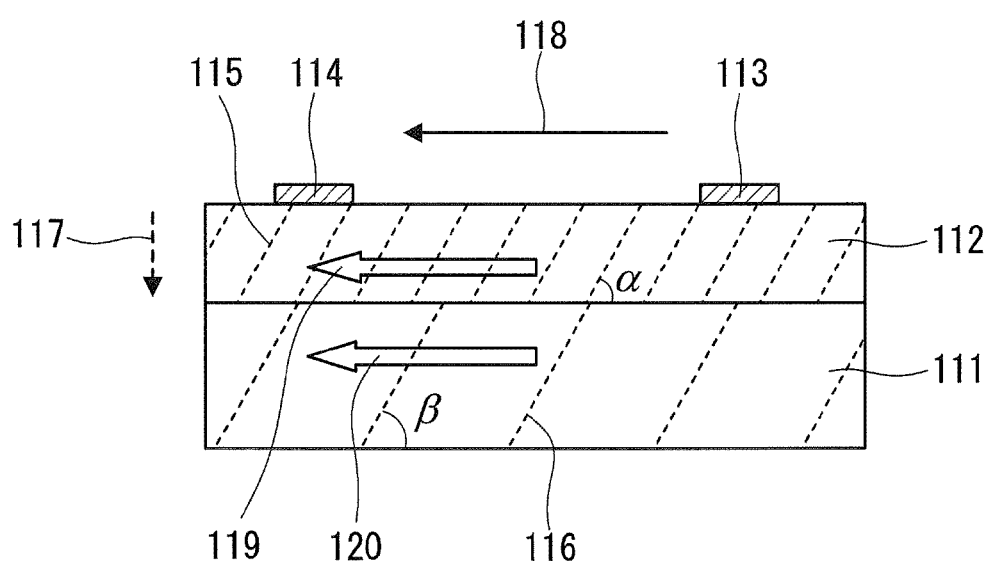
FIG. 11 is a cross-sectional view showing the basic structure of a thermoelectric conversion device that utilizes the anisotropic thermoelectric effect.

Preliminary experiments were carried out in order to confirm the relationship between the direction in which an electromagnetic wave enters the inclined thin film and the polarity of an electromotive force generated in the inclined thin film in the basic structure of a radiation detector, that is, an inclined thin film/substrate heterostructure (see FIG. 11).

A $Ca_xCoO_2$ thin film with a thickness of 150 nm was formed on one of the main surfaces of an $Al_2O_3$-n plane substrate.

The $Al_2O_3$-n plane substrate was cut to expose the $Al_2O_3$ (11-23) plane on the surface, and the $Al_2O_3$ (0001) plane was inclined at an angle of 61° ($\beta$=61°) with respect to the surface. Since $Ca_xCoO_2$ has a layered crystal structure of conductive $CoO_2$ layers (corresponding to the (001) planes) and insulating $Ca_x$ block layers that are stacked alternately, anisotropy occurs between a Seebeck coefficient $S_{ab}$ in the $CoO_2$ in-plane direction and a Seebeck coefficient $S_c$ in the direction (corresponding to the c-axis direction of $Ca_xCoO_2$) perpendicular to the $CoO_2$ in-plane direction. Therefore, the crystal planes serving as a factor inducing anisotropy in $Ca_xCoO_2$ are the (001) planes. $\Delta S(\Delta S=S_c-S_{ab})$ of $Ca_xCoO_2$ is about 35 μV/K.

In fabricating the $Ca_xCoO_2$ thin film, radio-frequency (RF) magnetron sputtering was used. As a sputtering target, a target containing Ca and Co that were mixed together in such a manner as to have a molar ratio of 1:1 was used. After the inside of a film forming chamber was evacuated to $1.0 \times 10^{-3}$ Pa or lower, the gas pressure in the chamber was maintained at 5 Pa by introducing a mixed gas of argon (96%) and oxygen (4%). In this state, the $Al_2O_3$ substrate was heated at 450° C. by a resistance heater, and then a $Ca_xCoO_2$ thin film was formed on the $Al_2O_3$ substrate by sputter deposition at an RF power of 100 W. After the thin film was deposited, the inside of the chamber was cooled to room temperature over 60 minutes while the same mixed gas of argon and oxygen was introduced (at 5 Pa).

The cation composition ratio of the $Ca_xCoO_2$ thin film thus fabricated was evaluated with an energy dispersive x-ray spectrometer. As a result, the composition ratio of Ca and Co was approximately 1:2 (i.e., x was approximately equal to 0.5). An X-ray diffraction measurement was carried out to examine the orientation of the $Ca_xCoO_2$ thin film. As a result, it was found that the (001) plane of $Ca_xCoO_2$ was inclined at an inclination angle of 62 degrees with respect to the substrate surface. Accordingly, the inclination angle $\alpha$ of the $Ca_xCoO_2$ thin film was 62°.

A pair of electrodes composed of Au was formed by vacuum vapor deposition on the surface of the $Ca_xCoO_2$ thin film thus obtained as an inclined thin film. Thus, a basic structure of a radiation detector as shown in FIG. 11 was fabricated. The Au electrodes of the pair were opposed to each other in the direction parallel to the direction in which the crystal planes, which are $CoO_2$ planes, were aligned inclined, and the distance between the electrodes was set at 6 mm. This distance between the electrodes can be optimized according to the intended use and the installation location, and is not limited to 6 mm.

Figure 9:
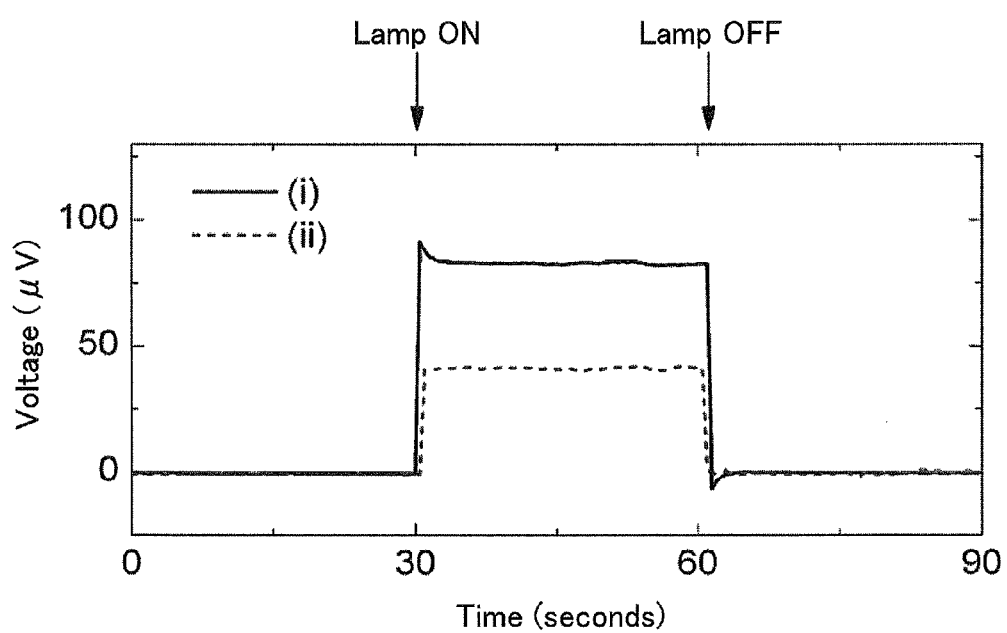
FIG. 9 is a graph showing results of preliminary experiments performed on a device having an inclined thin film/substrate basic structure, for use in examples of the present invention. More specifically.
Figure 10:
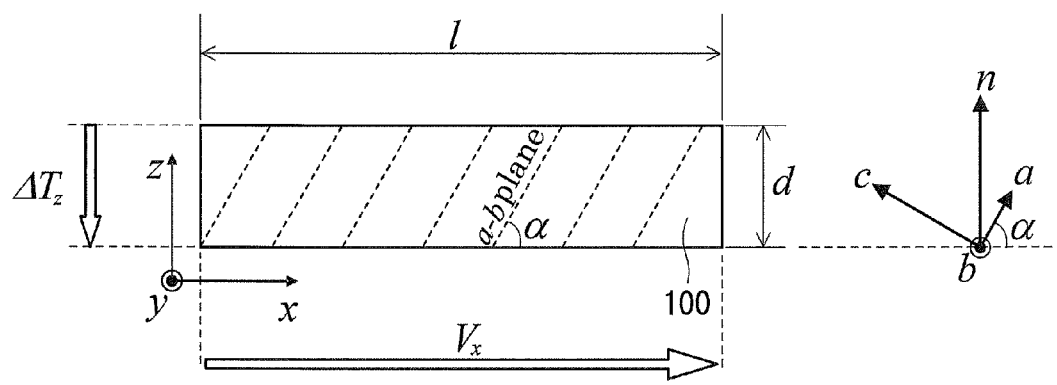
FIG. 10 is a diagram of a coordinate system for explaining the anisotropic thermoelectric effect.

In order to evaluate the basic properties of the radiation detector configured as described above, an electromagnetic wave emitted from an infrared lamp (with a wavelength of 800 to 2000 nm) was allowed to enter the radiation detector by the following two methods, and electromotive forces generated between the Au electrodes were measured respectively. The two methods are (i) a method in which the electromagnetic wave enters the radiation detector through the interface between air and the $Ca_xCoO_2$ thin film, and (ii) a method in which the electromagnetic wave enters the radiation detector through the interface between air and the $Al_2O_3$ substrate. FIG. 9 shows the measurement results of the electromotive forces generated in the $Ca_xCoO_2$ thin film with a thickness of 150 nm at a power of 300 mW of the infrared lamp. FIG. 9 is a graph showing temporal changes in the electromotive forces according to the entry and interruption of the electromagnetic wave.

From the results shown in FIG. 9, it was found that electromotive forces with positive values were generated during the irradiation with the infrared lamp in either direction. Generally, when an electromagnetic wave enters a sample made of a thermoelectric conversion material, the absorption of the electromagnetic wave is greatest near the surface through which the electromagnetic wave enters, and decreases as it goes deeper into the sample. Therefore, a temperature gradient in the sample is expected to coincide with the direction in which the electromagnetic wave enters. On the other hand, the polarity of the electromotive force generated by the anisotropic thermoelectric effect depends on the direction of the temperature gradient when the type of a carrier (a p-type or an n-type) and the direction of inclination of the crystal planes are determined. Therefore, if the electromagnetic wave enters in the reverse direction under the above measurement conditions, it is expected that the polarity of the electromotive force generated by the anisotropic thermoelectric effect also is reversed.

However, the present inventors have found out that, as shown in FIG. 9, in a $Ca_xCoO_2$ thin film/$Al_2O_3$ substrate heterostructure, an electromotive force that is generated when an electromagnetic wave enters the $Ca_xCoO_2$ thin film through the interface between air and the $Ca_xCoO_2$ thin film has the same polarity as an electromotive force that is generated when an electromagnetic wave enters the $Ca_xCoO_2$ thin film through the interface between the $Ca_xCoO_2$ thin film and the $Al_2O_3$ substrate (i.e., through the interface between air and the $Al_2O_3$ substrate). More specifically, we have found out that a temperature gradient occurs constantly in one direction when the electromagnetic wave enters the $Ca_xCoO_2$ thin film in either direction, and that the $Ca_xCoO_2$ thin film has a higher temperature at the interface between air and the $Ca_xCoO_2$ thin film than at the interface between the $Ca_xCoO_2$ thin film and the $Al_2O_3$ substrate.

To take advantage of these properties, the present inventors have devised a structure as shown in FIG. 1, in which inclined thin films made of a thermoelectric conversion material like $Ca_xCoO_2$ are disposed on both of the main surfaces of an $Al_2O_3$ substrate.

Example 1 and Comparative Example 1

As a radiation detector of Example 1, samples having the same structure as that shown in FIG. 1 were fabricated.

As an inclined substrate, the same $Al_2O_3$-n plane substrate as used in the above preliminary experiments was used. $Ca_xCoO_2$ thin films, as the first inclined thin film 12 and the second inclined thin film 13, were formed on both of the main surfaces of the $Al_2O_3$-n plane substrate in the same manner as in the above preliminary experiments. The first inclined thin film 12 and the second inclined thin film 13 had the same thickness for each sample. $Ca_xCoO_2$ thin films each having thicknesses of 10 nm, 70 nm, 150 nm, 400 nm, 600 nm, and 1100 nm were fabricated. An X-ray diffraction measurement was carried out to examine the crystal orientation. As a result, it was found that a $Ca_xCoO_2$ thin film as the first inclined thin film 12 (hereinafter referred to as a "first $Ca_xCoO_2$ thin film") and a $Ca_xCoO_2$ thin film as the second inclined thin film 13 (hereinafter referred to as a "second $Ca_xCoO_2$ thin film") were each formed in such a manner that the $Ca_xCoO_2$ (001) planes were inclined at an angle of 62 degrees with respect to the surface of the substrate. In other words, both of the inclination angle $\alpha_1$ of the first inclined thin film 12 and the inclination angle $\alpha_2$ of the second inclined thin film 13 were 62°.

The first extraction electrode 17 and the connection electrode 18 composed of Au were formed by vacuum vapor deposition on the surface of the first $Ca_xCoO_2$ thin film thus obtained. The first extraction electrode 17 and the connection electrode 18 were formed in such a manner that they are opposed to each other in the direction in which the $Ca_xCoO_2$ (001) planes as the crystal planes were aligned inclined and they were spaced at a distance of 6 mm. When the connection electrode 18 was formed on the side surface of the device (an inclined thin film/substrate/inclined thin film structure), the device was inclined to an Au target. The connection electrode 18 extending from the side surface of the device and the second extraction electrode 19 were formed on the surface of the second $Ca_xCoO_2$ thin film in the same manner. The connection electrode 18 and the second extraction electrode 19 were formed in such a manner that they are opposed to each other in the direction in which the $Ca_xCoO_2$ (001) planes as the crystal planes were aligned inclined and they were spaced at a distance of 6 mm. The pattern of these electrodes were formed on the surface of the $Al_2O_3$ substrate using a metal mask during the vapor deposition of Au.

The samples of the radiation detector having a $Ca_xCoO_2$ thin film/$Al_2O_3$ substrate/$Ca_xCoO_2$ thin film heterostructure thus fabricated were prepared as the samples of Example 1.

On the other hand, the samples of the radiation detector configured as shown in FIG. 11 and each having the inclined thin films ($Ca_xCoO_2$ thin films) with thicknesses of 10 nm, 70 nm, 150 nm, 400 nm, 600 nm, and 1100 nm were fabricated in the same manner as in the preliminary experiments and prepared as the samples of Comparative Example 1.

An electromagnetic wave emitted from an infrared lamp (with a wavelength of 800 to 2000 nm) was allowed to enter each of the samples of Example 1 from the first $Ca_xCoO_2$ thin film side, and an electromotive force generated between the first extraction electrode 17 and the second extraction electrode 19 was measured. On the other hand, an electromagnetic wave emitted from an infrared lamp (with a wavelength of 800 to 2000 nm) was allowed to enter each of the samples of Comparative Example 1 from the $Ca_xCoO_2$ thin film side, and an electromotive force generated between the Au electrodes of the pair was measured. The power of the infrared lamp was 480 mW. Table 1 shows the results.

TABLE 1

| | Thickness (nm) of $Ca_xCoO_2$ thin film | | | | | |
| --- | --- | --- | --- | --- | --- | --- |
| | 10 | 70 | 150 | 400 | 600 | 1100 |
| Electromotive force (µV) in Comparative Example 1 ($Ca_xCoO_2$ thin film/$Al_2O_3$-n plane substrate heterostructure) | 15 | 66 | 107 | 109 | 138 | 141 |
| Electromotive force (µV) in Example 1 ($Ca_xCoO_2$ thin film/$Al_2O_3$-n plane substrate/$Ca_xCoO_2$ thin film heterostructure) | 20 | 90 | 143 | 144 | 162 | 147 |

The samples of Example 1 and the samples of Comparative Examples 1 each having the $Ca_xCoO_2$ thin films with the same thicknesses were compared on a thickness-by-thickness basis. As a result, it was confirmed that the samples of Example 1 having a $Ca_xCoO_2$ thin film/$Al_2O_3$ substrate/$Ca_xCoO_2$ thin film heterostructure had up to 1.36 times higher sensitivities than the samples of Comparative Example 1 having a $Ca_xCoO_2$ thin film/$Al_2O_3$ substrate heterostructure.

Example 2 and Comparative Example 2

Samples of a radiation detector of Example 2 were fabricated in the same manner as in Example 1 except that $Al_2O_3$-s plane substrates were used instead of $Al_2O_3$-n plane substrates. Samples of Comparative Example 2 were fabricated in the same manner as in Comparative Example 1 except that $Al_2O_3$-s plane substrates were used instead of $Al_2O_3$-n plane substrates for the comparison with Example 2. Electromotive forces that are generated in the samples of Example 2 and Comparative Example 2 by the entry of an electromagnetic wave were measured in the same manner as in Example 1 and Comparative Example 1. The $Al_2O_3$-s plane substrate was cut to expose the $Al_2O_3$ (10-11) plane on the surface, and the $Al_2O_3$ (0001) plane was inclined at an angle of 72° (β=72°) with respect to the surface. The cation composition ratio of the $Ca_xCoO_2$ thin film formed on the $Al_2O_3$-s plane substrate was evaluated with an energy dispersive x-ray spectrometer. As a result, the composition ratio of Ca to Co was approximately 1:2 (i.e., x was approximately equal to 0.5). An X-ray diffraction measurement was carried out to examine the orientation of the first $Ca_xCoO_2$ thin film and the second $Ca_xCoO_2$ thin film. As a result, it was found that the (001) planes of $Ca_xCoO_2$ were stacked at an inclination angle of 70° with respect to the substrate surface. In other words, both of the inclination angle $\alpha_1$ of the first inclined thin film 12 and the inclination angle $\alpha_2$ of the second inclined thin film 13 were 70°. Table 2 shows the results.

TABLE 2

| | Thickness (nm) of $Ca_xCoO_2$ thin film | | | | | |
| --- | --- | --- | --- | --- | --- | --- |
| | 10 | 70 | 150 | 400 | 600 | 1100 |
| Electromotive force (µV) in Comparative Example 2 ($Ca_xCoO_2$ thin film/$Al_2O_3$-s plane substrate heterostructure) | 11 | 49 | 80 | 82 | 104 | 105 |
| Electromotive force (µV) in Example 2 ($Ca_xCoO_2$ thin film/$Al_2O_3$-s plane substrate/$Ca_xCoO_2$ thin film heterostructure) | 14 | 67 | 107 | 108 | 121 | 110 |

Example 2 and Comparative Example 2 using $Al_2O_3$-s plane substrates gave results similar to those of Example 1 and Comparative Example 1 using $Al_2O_3$-n plane substrates. More specifically, the samples of Example 2 achieved about 1.3 times higher sensitivities than those of Comparative Example 2. On the other hand, the absolute values of the electromotive forces obtained in the heterostructure of Example 2 were compared with those obtained in the heterostructure of Example 1 using $Al_2O_3$-n plane substrates, based on the results of Example 2 and those of Example 1. As a result, all the values of Example 2 were about 0.75 times the values of Example 1. This shows that the electromotive force obtained by a device having this configuration is actually proportional to sin 2α, as represented by Formula (1).

Example 3

A $Ca_xCoO_2$ thin film/$Al_2O_3$ substrate/$Ca_xCoO_2$ thin film heterostructure was fabricated using an $Al_2O_3$-n plane substrate in the same manner as in Example 1. The first $Ca_xCoO_2$ thin film and the second $Ca_xCoO_2$ thin film had the same thickness for each sample. $Ca_xCoO_2$ thin films each having thicknesses of 10 nm, 70 nm, 150 nm, 400 nm, 600 nm, and 1100 nm were fabricated. After the above structure was fabricated, an insulating film formed of an $Al_2O_3$ film with a thickness of 10 nm and an electromagnetic wave reflection film formed of an Au film with a thickness of 100 nm were formed on the surface of the second $Ca_xCoO_2$ thin film. Thus, the samples having the same configuration as that shown in FIG. 2 were fabricated. The $Al_2O_3$ film was formed by sputtering using an $Al_2O_3$ target. On the other hand, the Au film was formed by vacuum vapor deposition.

The electromotive forces of the samples of Example 3 having a $Ca_xCoO_2$ thin film/$Al_2O_3$ substrate/$Ca_xCoO_2$ thin film/$Al_2O_3$ film/Au film heterostructure thus fabricated were compared with the electromotive forces of the samples of Comparative Example 1 having a $Ca_xCoO_2$ thin film/$Al_2O_3$ substrate heterostructure. The electromotive forces of the samples were measured in the same manner as in the case of Example 1 and Comparative Example 1. Table 3 shows the results.

TABLE 3

| | Thickness (nm) of $Ca_xCoO_2$ thin film | | | | | |
| --- | --- | --- | --- | --- | --- | --- |
| | 10 | 70 | 150 | 400 | 600 | 1100 |
| Electromotive force (µV) in Comparative Example 1 ($Ca_xCoO_2$ thin film/$Al_2O_3$-n plane substrate heterostructure) | 15 | 66 | 107 | 109 | 138 | 141 |

TABLE 3-continued

|  | Thickness (nm) of $Ca_xCoO_2$ thin film | | | | | |
| --- | --- | --- | --- | --- | --- | --- |
|  | 10 | 70 | 150 | 400 | 600 | 1100 |
| Electromotive force (μV) in Example 3 ($Ca_xCoO_2$ thin film/$Al_2O_3$-n plane substrate/$Ca_xCoO_2$ thin film/$Al_2O_3$ film/Au film heterostructure) | 38 | 153 | 211 | 164 | 170 | 148 |

The samples of Example 3 and the samples of Comparative Examples 1 having the $Ca_xCoO_2$ thin films with the same thicknesses were compared on a thickness-by-thickness basis. As a result, it was confirmed that the samples of Example 3 having a $Ca_xCoO_2$ thin film/$Al_2O_3$ substrate/$Ca_xCoO_2$ thin film/$Al_2O_3$ film/Au film heterostructure generated up to 2.5 times greater electromotive forces than the samples of Comparative Example 1 having a $Ca_xCoO_2$ thin film/$Al_2O_3$ substrate heterostructure.

Example 4

A $Ca_xCoO_2$ thin film/$Al_2O_3$ substrate/$Ca_xCoO_2$ thin film heterostructure was fabricated using an $Al_2O_3$-s plane substrate in the same manner as in Example 2. The first $Ca_xCoO_2$ thin film and the second $Ca_xCoO_2$ thin film had the same thickness for each sample. $Ca_xCoO_2$ thin films each having thicknesses of 10 nm, 70 nm, 150 nm, 400 nm, 600 nm, and 1100 nm were fabricated. After the above structure was fabricated, an insulating film formed of an $Al_2O_3$ film with a thickness of 10 nm and an electromagnetic wave reflection film formed of an Au film with a thickness of 100 nm further were formed on the surface of the second $Ca_xCoO_2$ thin film. Thus, the samples having the same configuration as that shown in FIG. 2 were fabricated. The $Al_2O_3$ film was formed by sputtering using an $Al_2O_3$ target. On the other hand, the Au film was formed by vacuum vapor deposition.

The electromotive forces of the samples of Example 4 having a $Ca_xCoO_2$ thin film/$Al_2O_3$ substrate/$Ca_xCoO_2$ thin film/$Al_2O_3$ film/Au film heterostructure thus fabricated were compared with the electromotive forces of the samples of Comparative Example 2 having a $Ca_xCoO_2$ thin film/$Al_2O_3$ substrate heterostructure. The electromotive forces of the samples were measured in the same manner as in the case of Example 1 and Comparative Example 1. Table 4 shows the results.

TABLE 4

|  | Thickness (nm) of $Ca_xCoO_2$ thin film | | | | | |
| --- | --- | --- | --- | --- | --- | --- |
|  | 10 | 70 | 150 | 400 | 600 | 1100 |
| Electromotive force (μV) in Comparative Example 2 ($Ca_xCoO_2$ thin film/$Al_2O_3$-s plane substrate heterostructure) | 11 | 49 | 80 | 82 | 104 | 105 |
| Electromotive force (μV) in Example 4 ($Ca_xCoO_2$ thin film/$Al_2O_3$-s plane substrate/$Ca_xCoO_2$ thin film/$Al_2O_3$ film/Au film heterostructure) | 29 | 115 | 158 | 123 | 128 | 111 |

When the samples of Example 4 and the samples of Comparative Example 2 having the $Ca_xCoO_2$ thin films with the same thicknesses were compared on a thickness-by-thickness basis, they gave results similar to those of Example 3 and Comparative Example 1 using $Al_2O_3$-n plane substrates. More specifically, the samples of Example 4 having a $Ca_x$-$CoO_2$ thin film/$Al_2O_3$ substrate/$Ca_xCoO_2$ thin film/$Al_2O_3$ film/Au film heterostructure achieved about 2.5 times higher sensitivities than the samples of Comparative Example 2 having a $Ca_xCoO_2$ thin film/$Al_2O_3$ substrate heterostructure. On the other hand, the absolute values of the electromotive forces obtained in the heterostructure of Example 4 were compared with those obtained in the heterostructure of Example 3 using $Al_2O_3$-n plane substrates, based on the results of Example 4 and those of Example 3. As a result, all the values of Example 4 were about 0.75 times the values of Example 3. This shows that the electromotive force obtained by a device having this configuration is actually proportional to sin 2α, as represented by Formula (1).

Example 5 and Comparative Example 3

A $Ca_xCoO_2$ thin film/$Al_2O_3$ substrate/$Ca_xCoO_2$ thin film heterostructure was fabricated using an $Al_2O_3$-n plane substrate in the same manner as in Example 1. The first $Ca_xCoO_2$ thin film and the second $Ca_xCoO_2$ thin film had the same thickness for each sample. $Ca_xCoO_2$ thin films each having thicknesses of 10 nm, 70 nm, 150 nm, 400 nm, 600 nm, and 1100 nm were fabricated. Furthermore, both of the first and second $Ca_xCoO_2$ thin films were patterned into parallel lines. Then, the lines of the $Ca_xCoO_2$ thin film formed on one of the main surfaces of the $Al_2O_3$ substrate and the lines of the $Ca_xCoO_2$ thin film formed on the other main surface of the $Al_2O_3$ substrate were connected alternately in series. Thus, samples having the same configuration as that shown in FIG. 4A and FIG. 4B were fabricated.

In order to pattern the $Ca_xCoO_2$ thin film into parallel lines, a metal mask in which 40 rectangular openings with a width of 100 μm and a length of 8 mm were formed in parallel at a distance of 100 μm was used. A $Ca_xCoO_2$ thin film was sputter-deposited on each surface of the $Al_2O_3$ substrate covered with the metal mask, so that 40 $Ca_xCoO_2$ thin film lines each with a width of 100 μm and a length of 8 mm were formed on each main surface of the $Al_2O_3$ substrate. Extraction electrodes and connection electrodes made of Au were formed by vacuum vapor deposition. Thus, a series-connected body as shown in FIG. 4A and FIG. 4B was fabricated. The electrodes were formed so that each pair of electrodes were spaced at a distance of 6 mm on the $Ca_xCoO_2$ thin film line. Samples thus fabricated each had a light-receiving area of about 8 mm×8 mm, and had a configuration in which 80 $Ca_xCoO_2$ thin film lines with a length of 6 mm were series-connected.

In this manner, the following two types of samples were fabricated: samples in which the lines of the first $Ca_xCoO_2$ thin film and the lines of the second $Ca_xCoO_2$ thin film were arranged so as to overlap each other; and samples in which these lines were arranged so as not to overlap each other. The samples in which the lines of the first $Ca_xCoO_2$ thin film and the lines of the second $Ca_xCoO_2$ thin film were arranged so as to overlap each other were prepared as samples of Example 5a. The samples of Example 5a had the configuration shown in FIG. 7. The samples in which the lines of the first and second $Ca_xCoO_2$ thin films were arranged so as not to overlap each other were prepared as samples of Example 5b. The samples of Example 5b had the configuration shown in FIG. 6. Since two types of samples were fabricated for each thickness of the $Ca_xCoO_2$ thin films, 12 samples in total were fabricated.

On the other hand, for comparison, samples of Comparative Example 3 also were fabricated. First, a $Ca_xCoO_2$ thin film/$Al_2O_3$ substrate heterostructure was fabricated in the same manner as in Comparative Example 1. $Ca_xCoO_2$ thin films having thicknesses of 10 nm, 70 nm, 150 nm, 400 nm, 600 nm, and 1100 nm were prepared. Furthermore, the $Ca_xCoO_2$ thin films were patterned into parallel lines, and the resulting $Ca_xCoO_2$ thin film lines were connected in series. Thus, samples of Comparative Example 3 having the same configuration as that shown in FIG. 5 were fabricated.

In Comparative Example 3, in order to achieve a series-connected $Ca_xCoO_2$ thin film lines in the same light receiving area (of 8 mm×8 mm) as that of Example 5, a metal mask in which 20 rectangular openings with a width of 100 μm and a length of 8 mm were formed in parallel at a distance of 300 μm was used to pattern the $Ca_xCoO_2$ thin film into lines. After the parallel lines of the $Ca_xCoO_2$ thin film were formed, 100 μm wide connection electrodes made of Au were formed between adjacent $Ca_xCoO_2$ thin film lines at a distance of 100 μm from each of these adjacent lines, as shown in FIG. 5, to achieve a series connection of these parallel lines. Samples of Comparative Example 3 thus fabricated each had a light receiving area of about 8 mm×8 mm, and had a configuration in which 20 $Ca_xCoO_2$ thin film lines with a length of 6 mm were series-connected.

The electromotive forces of the samples of Example 5 (Example 5a and Example 5b) having a $Ca_xCoO_2$ thin film/$Al_2O_3$ substrate/$Ca_xCoO_2$ thin film heterostructure and those of the samples of Comparative Example 3 having a $Ca_xCoO_2$ thin film/$Al_2O_3$ substrate heterostructure were measured. The electromotive forces of the samples were measured in the same manner as in the case of Example 1 and Comparative Example 1. Table 5 shows the results.

TABLE 5

| | Thickness (nm) of $Ca_xCoO_2$ thin film | | | | | |
| --- | --- | --- | --- | --- | --- | --- |
| | 10 | 70 | 150 | 400 | 600 | 1100 |
| Electromotive force (μV) in Comparative Example 3 ($Ca_xCoO_2$ thin film/$Al_2O_3$-n plane substrate heterostructure) | 0.3 | 1.3 | 2.1 | 2.1 | 2.7 | 2.8 |
| Electromotive force (μV) in Example 5a ($Ca_xCoO_2$ thin film/$Al_2O_3$-n plane substrate/$Ca_xCoO_2$ thin film heterostructure, lines overlap) | 0.8 | 3.6 | 5.7 | 5.7 | 6.5 | 5.7 |
| Electromotive force (μV) in Example 5b ($Ca_xCoO_2$ thin film/$Al_2O_3$-n plane substrate/$Ca_xCoO_2$ thin film heterostructure, lines do not overlap) | 0.8 | 3.7 | 6.3 | 8.2 | 9.8 | 9.6 |

The samples having the $Ca_xCoO_2$ thin films with the same thicknesses were compared on a thickness-by-thickness basis. As a result, it was confirmed that, among the samples of Example 5 having a $Ca_xCoO_2$ thin film/$Al_2O_3$ substrate/$Ca_xCoO_2$ thin film heterostructure, the samples of Example 5a in which the lines on the front and back surfaces of the substrate overlapped each other generated up to 2.7 times greater electromotive forces than the samples of Comparative Example 3 having a $Ca_xCoO_2$ thin film/$Al_2O_3$ substrate heterostructure. Furthermore, it was confirmed that the samples of Example 5b in which the lines on the front and back surfaces of the substrate did not overlap each other generated up to 3.9 times greater electromotive forces than the samples of Comparative Example 3 having a $Ca_xCoO_2$ thin film/$Al_2O_3$ substrate heterostructure.

Example 6 and Comparative Example 4

A $Ca_xCoO_2$ thin film/$Al_2O_3$ substrate/$Ca_xCoO_2$ thin film heterostructure was fabricated using an $Al_2O_3$-s plane substrate in the same manner as in Example 2. The first $Ca_xCoO_2$ thin film and the second $Ca_xCoO_2$ thin film had the same thickness for each sample. $Ca_xCoO_2$ thin films each having thicknesses of 10 nm, 70 nm, 150 nm, 400 nm, 600 nm, and 1100 nm were fabricated. Furthermore, both of the first and second $Ca_xCoO_2$ thin films were patterned into parallel lines in the same manner as in Example 5. Then, the lines of the $Ca_xCoO_2$ thin film formed on one of the main surfaces of the $Al_2O_3$ substrate and the lines of the $Ca_xCoO_2$ thin film formed on the other main surface of the $Al_2O_3$ substrate were connected alternately in series. Thus, samples having the same configuration as that shown in FIG. 4A and FIG. 4B were fabricated.

In this manner, the following two types of samples were fabricated: samples in which the lines of the first $Ca_xCoO_2$ thin film and the lines of the second $Ca_xCoO_2$ thin film were arranged so as to overlap each other; and samples in which these lines were arranged so as not to overlap each other. The samples in which the lines of the first $Ca_xCoO_2$ thin film and the lines of the second $Ca_xCoO_2$ thin film were arranged so as to overlap each other were prepared as samples of Example 6a. The samples of Example 6a had the configuration shown in FIG. 7. The samples in which the lines of the first and second $Ca_xCoO_2$ thin films were arranged so as not to overlap each other were prepared as samples of Example 6b. The samples of Example 6b had the configuration shown in FIG. 6. Since two types of samples were fabricated for each thickness of the $Ca_xCoO_2$ thin films, 12 samples in total were fabricated.

On the other hand, for comparison, samples of Comparative Example 4 also were fabricated. First, a $Ca_xCoO_2$ thin film/$Al_2O_3$ substrate heterostructure was fabricated in the same manner as in Comparative Example 2. $Ca_xCoO_2$ thin films each having thicknesses of 10 nm, 70 nm, 150 nm, 400 nm, 600 nm, and 1100 nm were prepared. Furthermore, the $Ca_xCoO_2$ thin films were patterned into parallel lines, and the resulting $Ca_xCoO_2$ thin film lines were connected in series. Thus, samples of Comparative Example 4 having the same configuration as that shown in FIG. 5 were fabricated.

The electromotive forces of the samples of Example 6 (Example 6a and Example 6b) having a $Ca_xCoO_2$ thin film/$Al_2O_3$ substrate/$Ca_xCoO_2$ thin film heterostructure and those of the samples of Comparative Example 4 having a $Ca_xCoO_2$ thin film/$Al_2O_3$ substrate heterostructure were measured. The electromotive forces of the samples were measured in the same manner as in the case of Example 1 and Comparative Example 1. Table 6 shows the results.

TABLE 6

| | Thickness (nm) of $Ca_xCoO_2$ thin film | | | | | |
| --- | --- | --- | --- | --- | --- | --- |
| | 10 | 70 | 150 | 400 | 600 | 1100 |
| Electromotive force (μV) in Comparative Example 4 ($Ca_xCoO_2$ thin film/$Al_2O_3$-s plane substrate heterostructure) | 0.2 | 0.9 | 1.6 | 1.6 | 2.0 | 2.1 |
| Electromotive force (μV) in Example 6a ($Ca_xCoO_2$ thin film/$Al_2O_3$-s plane substrate/$Ca_xCoO_2$ thin film heterostructure, lines overlap) | 0.6 | 2.7 | 4.3 | 4.3 | 4.8 | 4.4 |
| Electromotive force (μV) in Example 6b ($Ca_xCoO_2$ thin film/$Al_2O_3$-s plane substrate/$Ca_xCoO_2$ thin film heterostructure, lines do not overlap) | 0.6 | 2.8 | 4.8 | 6.1 | 7.3 | 7.2 |

When the samples of Example 6 and the samples of Comparative Example 4 having the $Ca_xCoO_2$ thin films with the same thicknesses were compared on a thickness-by-thickness basis, they gave results similar to those of Example 5 and Comparative Example 3 using $Al_2O_3$-n plane substrates. More specifically, it was confirmed that, among the samples of Example 6 having a $Ca_xCoO_2$ thin film/$Al_2O_3$ substrate/ $Ca_xCoO_2$ thin film heterostructure, the samples of Example 6a in which the lines on the front and back surfaces of the substrate overlapped each other generated up to 3.0 times greater electromotive forces than the samples of Comparative Example 4 having a $Ca_xCoO_2$ thin film/$Al_2O_3$ substrate heterostructure. Furthermore, it was confirmed that the samples of Example 6b in which the lines on the front and back surfaces of the substrate did not overlap each other generated up to 3.8 times greater electromotive forces than the samples of Comparative Example 3 having a $Ca_xCoO_2$ thin film/ $Al_2O_3$ substrate heterostructure. On the other hand, the absolute values of the electromotive forces obtained in the heterostructure of Example 6 were compared with those obtained in the heterostructure of Example 5 using $Al_2O_3$-n plane substrates, based on the results of Example 6 and those of Example 5. As a result, all the values of Example 6 were about 0.75 times the values of Example 5. This shows that the electromotive force obtained by a device having this configuration is actually proportional to sin $2\alpha$, as represented by Formula (1).

Example 7

Samples having the same structure as that of Example 5 were prepared, and an insulating film formed of an $Al_2O_3$ film with a thickness of 10 nm and further an electromagnetic wave reflection film formed of an Au film with a thickness of 100 nm were formed on the surface of one of the $Ca_xCoO_2$ thin films in each of these samples. Thus, samples of Example 7 were prepared. More specifically, samples in which $Ca_xCoO_2$ thin films each had thicknesses of 10 nm, 70 nm, 150 nm, 400 nm, 600 nm, and 1100 nm were fabricated in the same manner as in Example 5. $Al_2O_3$ films and Au films were formed by sputtering and vacuum vapor deposition, respectively, at room temperature. The following two types of samples were fabricated in the same manner as in Example 5: samples in which the lines of the first $Ca_xCoO_2$ thin film and the lines of the second $Ca_xCoO_2$ thin film were arranged so as to overlap each other; and samples in which these lines were arranged so as not to overlap each other. The samples in which the lines of the first $Ca_xCoO_2$ thin film and the lines of the second $Ca_xCoO_2$ thin film were arranged so as to overlap each other were prepared as samples of Example 7a. The samples of Example 7a had the configuration shown in FIG. 7. The samples in which the lines of the first and second $Ca_xCoO_2$ thin films were arranged so as not to overlap each other were prepared as samples of Example 7b. The samples of Example 7b had the configuration shown in FIG. 6. Since two types of samples were fabricated for each thickness of the $Ca_xCoO_2$ thin films, 12 samples in total were fabricated.

The samples of Example 7 thus fabricated were compared with the samples of Comparative Example 3. The electromotive forces of the samples of Example 7 (Example 7a and Example 7b) having a $Ca_xCoO_2$ thin film/$Al_2O_3$ substrate/ $Ca_xCoO_2$ thin film/$Al_2O_3$ film/Au film heterostructure and those of the samples of Comparative Example 3 having a $Ca_xCoO_2$ thin film/$Al_2O_3$ substrate heterostructure were measured. The electromotive forces of the samples were measured in the same manner as in the case of Example 1 and Comparative Example 1. Table 7 shows the results.

TABLE 7

| | Thickness (nm) of $Ca_xCoO_2$ thin film | | | | | |
|---|---|---|---|---|---|---|
| | 10 | 70 | 150 | 400 | 600 | 1100 |
| Electromotive force (µV) in Comparative Example 3 ($Ca_xCoO_2$ thin film/$Al_2O_3$-n plane substrate heterostructure) | 0.3 | 1.3 | 2.1 | 2.1 | 2.7 | 2.8 |
| Electromotive force (µV) in Example 7a ($Ca_xCoO_2$ thin film/$Al_2O_3$-n plane substrate/$Ca_xCoO_2$ thin film/$Al_2O_3$ film/Au film heterostructure, lines overlap) | 1.5 | 6.1 | 8.4 | 6.5 | 6.8 | 5.9 |
| Electromotive force (µV) in Example 7b ($Ca_xCoO_2$ thin film/$Al_2O_3$-n plane substrate/$Ca_xCoO_2$ thin film/$Al_2O_3$ film/Au film heterostructure, lines do not overlap) | 1.5 | 6.9 | 10.8 | 11.2 | 12 | 10.2 |

The samples having the $Ca_xCoO_2$ thin films with the same thicknesses were compared on a thickness-by-thickness basis. As a result, it was confirmed that, among the samples of Example 7 having a $Ca_xCoO_2$ thin film/$Al_2O_3$ substrate/$Ca_x$-$CoO_2$ thin film/$Al_2O_3$ film/Au film heterostructure, the samples of Example 7a in which the lines on the front and back surfaces of the substrate overlapped each other generated up to 5.0 times greater electromotive forces than the samples of Comparative Example 3 having a $Ca_xCoO_2$ thin film/$Al_2O_3$ substrate heterostructure. Furthermore, it was confirmed that the samples of Example 7b in which the lines on the front and back surfaces of the substrate did not overlap each other generated up to 5.3 times greater electromotive forces than the samples of Comparative Example 3 having a $Ca_xCoO_2$ thin film/$Al_2O_3$ substrate heterostructure.

Example 8

Samples having the same structure as that of Example 6 were prepared, and an insulating film formed of an $Al_2O_3$ film with a thickness of 10 nm and further an electromagnetic wave reflection film formed of an Au film with a thickness of 100 nm were formed on the surface of one of the $Ca_xCoO_2$ thin films in each of these samples. Thus, samples of Example 8 were prepared. More specifically, samples in which $Ca_x$-$CoO_2$ thin films each had thicknesses of 10 nm, 70 nm, 150 nm, 400 nm, 600 nm, and 1100 nm were fabricated in the same manner as in Example 6. $Al_2O_3$ films and Au films were formed by sputtering and vacuum vapor deposition, respectively, at room temperature. The following two types of samples were fabricated in the same manner as in Example 6: samples in which the lines of the first $Ca_xCoO_2$ thin film and the lines of the second $Ca_xCoO_2$ thin film were arranged so as to overlap each other; and samples in which these lines were arranged so as not to overlap each other. The samples in which the lines of the first $Ca_xCoO_2$ thin film and the lines of the second $Ca_xCoO_2$ thin film were arranged so as to overlap each other were prepared as samples of Example 8a. The samples of Example 8a had the configuration shown in FIG. 7. The samples in which the lines of the first and second $Ca_xCoO_2$ thin films were arranged so as not to overlap each other were prepared as samples of Example 8b. The samples of Example 8b had the configuration shown in FIG. 6. Since two types of samples were fabricated for each thickness of the $Ca_xCoO_2$ thin films, 12 samples in total were fabricated.

The samples of Example 8 thus fabricated were compared with the samples of Comparative Example 4. The electromotive forces of the samples of Example 8 (Example 8a and Example 8b) having a $Ca_xCoO_2$ thin film/$Al_2O_3$ substrate/$Ca_xCoO_2$ thin film/$Al_2O_3$ film/Au film heterostructure and those of the samples of Comparative Example 4 having a $Ca_xCoO_2$ thin film/$Al_2O_3$ substrate heterostructure were measured. The electromotive forces of the samples were measured in the same manner as in the case of Example 1 and Comparative Example 1. Table 8 shows the results.

TABLE 8

|  | Thickness (nm) of $Ca_xCoO_2$ thin film | | | | | |
| --- | --- | --- | --- | --- | --- | --- |
|  | 10 | 70 | 150 | 400 | 600 | 1100 |
| Electromotive force (μV) in Comparative Example 4 ($Ca_xCoO_2$ thin film/$Al_2O_3$-s plane substrate heterostructure) | 0.2 | 0.9 | 1.6 | 1.6 | 2.0 | 2.1 |
| Electromotive force (μV) in Example 8a ($Ca_xCoO_2$ thin film/$Al_2O_3$-s plane substrate/$Ca_xCoO_2$ thin film/$Al_2O_3$ film/Au film heterostructure, lines overlap) | 1.1 | 4.6 | 6.3 | 4.9 | 5.1 | 4.4 |
| Electromotive force (μV) in Example 8b ($Ca_xCoO_2$ thin film/$Al_2O_3$-s plane substrate/$Ca_xCoO_2$ thin film/$Al_2O_3$ film/Au film heterostructure, lines do not overlap) | 1.1 | 5.2 | 8.1 | 8.4 | 9 | 7.7 |

When the samples of Example 8 and the samples of Comparative Example 4 having the $Ca_xCoO_2$ thin films with the same thicknesses were compared on a thickness-by-thickness basis, they gave results similar to those of Example 7 and Comparative Example 4 using $Al_2O_3$-n plane substrates. More specifically, it was confirmed that, among the samples of Example 8 having a $Ca_xCoO_2$ thin film/$Al_2O_3$ substrate/$Ca_xCoO_2$ thin film/$Al_2O_3$ film/Au film heterostructure, the samples of Example 8a in which the lines on the front and back surfaces of the substrate overlapped each other generated up to 5.5 times greater electromotive forces than the samples of Comparative Example 4 having a $Ca_xCoO_2$ thin film/$Al_2O_3$ substrate heterostructure. Furthermore, it was confirmed that the samples of Example 8b in which the lines on the front and back surfaces of the substrate did not overlap each other generated up to 5.7 times greater electromotive forces than the samples of Comparative Example 4 having a $Ca_xCoO_2$ thin film/$Al_2O_3$ substrate heterostructure. On the other hand, the absolute values of the electromotive forces obtained in the heterostructure of Example 8 were compared with those obtained in the heterostructure of Example 7 using $Al_2O_3$-n plane substrates, based on the results of Example 8 and those of Example 7. As a result, all the values of Example 8 were about 0.75 times the values of Example 7. This shows that the electromotive force obtained by a device having this configuration is actually proportional to sin 2α, as represented by Formula (1).

Example 9

As a radiation detector of Example 9, samples having the same structure as that shown in FIG. 3, FIG. 8A, and FIG. 8B were fabricated.

A $Ca_xCoO_2$ thin film/$Al_2O_3$ substrate heterostructure was fabricated using an $Al_2O_3$-n plane substrate in the same manner as in Comparative Example 1. $Ca_xCoO_2$ thin films having thicknesses of 10 nm, 70 nm, 150 nm, 400 nm, 600 nm, and 1100 nm were prepared. Furthermore, the $Ca_xCoO_2$ thin films were patterned into parallel lines, and the connection electrodes were extended to the back surface of the inclined substrate as shown in FIG. 8A and FIG. 8B. Thus, samples in which the $Ca_xCoO_2$ thin film lines were connected in series were fabricated.

In order to pattern the $Ca_xCoO_2$ thin film into parallel lines, a metal mask in which 40 rectangular openings with a width of 100 μm and a length of 8 mm were formed in parallel at a distance of 100 μm was used. A $Ca_xCoO_2$ thin film was sputter-deposited on the surface of the $Al_2O_3$ substrate covered with the metal mask, so that 40 $Ca_xCoO_2$ thin film lines each with a width of 100 μm and a length of 8 mm were formed on one of the main surfaces of the $Al_2O_3$ substrate. Extraction electrodes and connection electrodes made of Au were formed by vacuum vapor deposition. Thus, a series-connected body as shown in FIG. 8A and FIG. 8B was fabricated. The electrodes were formed so that each pair of electrodes were spaced at a distance of 6 mm on the $Ca_xCoO_2$ thin film line. Samples thus fabricated each had a light-receiving area of about 8 mm×8 mm, and had a configuration in which 40 $Ca_xCoO_2$ thin film lines with a length of 6 mm were series-connected.

The samples of Example 9 thus fabricated were compared with the samples of Comparative Example 3. The electromotive forces of the samples of Example 9 having a $Ca_xCoO_2$ thin film/$Al_2O_3$ substrate/Au film (serving as connection electrodes and an electromagnetic wave reflection film) heterostructure and those of the samples of Comparative Example 3 having a $Ca_xCoO_2$ thin film/$Al_2O_3$ substrate heterostructure were measured. The electromotive forces of the samples were measured in the same manner as in the case of Example 1 and Comparative Example 1. Table 9 shows the results.

TABLE 9

|  | Thickness (nm) of $Ca_xCoO_2$ thin film | | | | | |
| --- | --- | --- | --- | --- | --- | --- |
|  | 10 | 70 | 150 | 400 | 600 | 1100 |
| Electromotive force (μV) in Comparative Example 3 ($Ca_xCoO_2$ thin film/$Al_2O_3$-n plane substrate heterostructure) | 0.3 | 1.3 | 2.1 | 2.1 | 2.7 | 2.8 |
| Electromotive force (μV) in Example 9 ($Ca_xCoO_2$ thin film/$Al_2O_3$-n plane substrate/Au film (connection electrodes and electromagnetic wave reflection film) heterostructure) | 1.2 | 4.8 | 7.2 | 6.0 | 6.7 | 6.0 |

The samples having the $Ca_xCoO_2$ thin films with the same thicknesses were compared on a thickness-by-thickness basis. As a result, it was confirmed that the samples of Example 9 having a $Ca_xCoO_2$ thin film/$Al_2O_3$ substrate/Au film (serving as connection electrodes and an electromagnetic wave reflection film) heterostructure generated up to 4 times greater electromotive forces than the samples of Comparative Example 3 having a $Ca_xCoO_2$ thin film/$Al_2O_3$ substrate heterostructure.

Example 10

Samples having the same configuration as that of Example 9 except that $Al_2O_3$-s plane substrates were used instead of $Al_2O_3$-n plane substrates were fabricated in the same manner as in Example 9, and these samples were prepared as samples of Example 10.

The samples of Example 10 thus fabricated were compared with the samples of Comparative Example 4. The electromotive forces of the samples of Example 10 having a $Ca_xCoO_2$ thin film/Al$_2$O$_3$ substrate/Au film (serving as connection electrodes and an electromagnetic wave reflection film) heterostructure and those of the samples of Comparative Example 4 having a Ca$_x$CoO$_2$ thin film/Al$_2$O$_3$ substrate heterostructure were measured. The electromotive forces of the samples were measured in the same manner as in the case of Example 1 and Comparative Example 1. Table 10 shows the results.

TABLE 10

|  | Thickness (nm) of Ca$_x$CoO$_2$ thin film | | | | | |
| --- | --- | --- | --- | --- | --- | --- |
|  | 10 | 70 | 150 | 400 | 600 | 1100 |
| Electromotive force (μV) in Comparative Example 4 (Ca$_x$CoO$_2$ thin film/Al$_2$O$_3$-s plane substrate heterostructure) | 0.2 | 0.9 | 1.6 | 1.6 | 2.0 | 2.1 |
| Electromotive force (μV) in Example 10 (Ca$_x$CoO$_2$ thin film/Al$_2$O$_3$-s plane substrate/Au film (connection electrodes and electromagnetic wave reflection film) heterostructure) | 0.9 | 3.6 | 5.4 | 4.5 | 5.0 | 4.5 |

When the samples of Example 10 and the samples of Comparative Example 4 having the Ca$_x$CoO$_2$ thin films with the same thicknesses were compared on a thickness-by-thickness basis, they gave results similar to those of Example 9 and Comparative Example 3 using Al$_2$O$_3$-n plane substrates. More specifically, it was confirmed that the samples of Example 10 having a Ca$_x$CoO$_2$ thin film/Al$_2$O$_3$ substrate/Au film (serving as connection electrodes and an electromagnetic wave reflection film) heterostructure generated up to 4.5 times greater electromotive forces than the samples of Comparative Example 4 having a Ca$_x$CoO$_2$ thin film/Al$_2$O$_3$ substrate heterostructure. On the other hand, the absolute values of the electromotive forces obtained in the heterostructure of Example 10 were compared with those obtained in the heterostructure of Example 9 using Al$_2$O$_3$-n plane substrates, based on the results of Example 10 and those of Example 9. As a result, all the values of Example 10 were about 0.75 times the values of Example 9. This shows that the electromotive force obtained by a device having this configuration is actually proportional to sin 2α, as represented by Formula (1).

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The radiation detectors according to the present invention each have excellent radiation detection properties and can be used to detect various objects, such as a temperature sensor and a laser beam power meter, involved in the radiation of electromagnetic waves.

What is claimed is:

1. A method of detecting an electromagnetic wave, the method comprising:
    a step of preparing a radiation detector, wherein
        the radiation detector comprises a thin film, a substrate, an electromagnetic wave reflection film, a first electrode, and a second electrode,
        the substrate is sandwiched between the thin film and the electromagnetic wave reflection film,
        the thin film is a crystal, has anisotropy in its Seebeck coefficient, and has a crystal plane serving as a factor in inducing anisotropy,
        the substrate is a crystal,
        an angle α formed between the crystal plane of the thin film and a surface of the substrate is not less than 10° and not more than 80°,
        an angle β formed between a low-index plane of the substrate and the surface of the substrate is not less than 10° and not more than 80°,
        the first electrode and the second electrode are electrically connected to the thin film; and
    a step of detecting a potential difference between the first electrode and the second electrode so as to determine that the radiation detector is irradiated with the electromagnetic wave if the potential difference is detected.

2. The method according to claim 1, wherein the first electrode and the second electrode are each composed of Al, Cu, Ag, or Au.

3. The method according to claim 1, wherein the thin film is composed of Ca$_x$CoO$_2$, Sr$_x$CoO$_2$, Na$_x$CoO$_2$, Ca$_3$Co$_4$O$_9$, Sr$_3$Co$_4$O$_9$, or YBa$_2$Cu$_3$O$_{7-\delta}$, where x satisfies $0.15 \leq x \leq 0.5$ in Ca$_x$CoO$_2$ and Sr$_x$CoO$_2$, and $0.15 \leq x \leq 1$ in Na$_x$CoO$_2$, and δ is the amount of oxygen deficiency and satisfies $0 \leq \delta \leq 0.7$.

4. A radiation detector comprising a thin film, a substrate, an electromagnetic wave reflection film, a first electrode, and a second electrode, wherein
    the substrate is sandwiched between the thin film and the electromagnetic wave reflection film,
    the thin film is a crystal, has anisotropy in its Seebeck coefficient, and has a crystal plane serving as a factor in inducing anisotropy,
    the substrate is a crystal,
    an angle α formed between the crystal plane of the thin film and a surface of the substrate is not less than 10° and not more than 80°,
    an angle β formed between a low-index plane of the substrate and the surface of the substrate is not less than 10° and not more than 80°,
    the first electrode and the second electrode are electrically connected to the thin film.

5. The radiation detector according to claim 4, wherein the first electrode and the second electrode are each composed of Al, Cu, Ag, or Au.

6. The radiation detector according to claim 4, wherein the thin film is composed of Ca$_x$CoO$_2$, Sr$_x$CoO$_2$, Na$_x$CoO$_2$, Ca$_3$Co$_4$O$_9$, Sr$_3$Co$_4$O$_9$, or YBa$_2$Cu$_3$O$_{7-\delta}$, where x satisfies $0.15 \leq x \leq 0.5$ in Ca$_x$CoO$_2$ and Sr$_x$CoO$_2$, and $0.15 \leq x \leq 1$ in Na$_x$CoO$_2$, and δ is the amount of oxygen deficiency and satisfies $0 \leq \delta \leq 0.7$.

* * * * *